(12) United States Patent
Xu et al.

(10) Patent No.: US 8,619,498 B2
(45) Date of Patent: Dec. 31, 2013

(54) DEVICE AND METHOD FOR CALCULATING 3D ANGLE GATHERS FROM REVERSE TIME MIGRATION

(75) Inventors: Sheng Xu, Katy, TX (US); Yu Zhang, Katy, TX (US); Bing Tang, Katy, TX (US)

(73) Assignee: Cggveritas Services (U.S.) Inc., Houston, TX (US)

( * ) Notice: Subject to any disclaimer, the term of this patent is extended or adjusted under 35 U.S.C. 154(b) by 343 days.

(21) Appl. No.: 13/013,988

(22) Filed: Jan. 26, 2011

(65) Prior Publication Data

US 2012/0075954 A1 Mar. 29, 2012

Related U.S. Application Data

(60) Provisional application No. 61/386,099, filed on Sep. 24, 2010.

(51) Int. Cl.
*G01V 1/50* (2006.01)

(52) U.S. Cl.
USPC .......................................................... 367/38

(58) Field of Classification Search
USPC ............................................. 367/38, 46, 74
See application file for complete search history.

(56) References Cited

U.S. PATENT DOCUMENTS

| | | | |
|---|---|---|---|
| 8,239,135 B2 * | 8/2012 | Day et al. .......................... 702/17 |
| 2009/0231956 A1 * | 9/2009 | Schonewille ..................... 367/46 |
| 2009/0257308 A1 * | 10/2009 | Bevc et al. ........................ 367/53 |
| 2010/0114494 A1 * | 5/2010 | Higginbotham et al. ........ 702/16 |

OTHER PUBLICATIONS

Zhang et al., 2009 EAGE first break, vol. 27, Jan. 2009, pp. 53-59.*
Sheng Xu et al., "Antileakage Fourier Transform for Seismic Data Regularization", Geophysics, vol. 70. No. 4, Jul.-Aug. 2005, Society of Exploration Geophysicists, pp. 87-95.
Sheng Xu et al., "Common-angle Migration: A Strategy for Imaging Complex Media", Geophysics, vol. 66. No. 6, Nov.-Dec. 2001, Society of Exploration Geophysicists, pp. 1877-1894.
Yu Zang et al., "True Amplitude Wave Equation Migration Arising From True Amplitude One-Way Wave Equations", Institute of Physics Publishing, Inverse Problems 19 (2003) pp. 1113-1138.
Yu Zhang et al., "True-Amplitude, Angle-Domain, Common-image Gathers One-Way Wave-Equation Migrations", Geophysics, vol. 72. No. 1, Jan.-Feb. 2007, Society of Exploration Geophysicists, pp. 49-58.

* cited by examiner

*Primary Examiner* — Mark Hellner
*Assistant Examiner* — Hovhannes Baghdasaryan
(74) *Attorney, Agent, or Firm* — Patent Portfolio Builders PLLC

(57) ABSTRACT

A method for calculating angle domain common image gathers (ADCIGs). The method includes calculating a source wavefield $p_F$ of a seismic source; calculating a receiver wavefield $p_B$ of a seismic receiver; applying an algorithm of antileakage Fourier transform (ALFT) to transform the source wavefield $p_F$ to a wavenumber domain; applying the ALFT algorithm to the receiver wavefield to transform the receiver wavefield in the wavenumber domain; determining an imaging condition to the ALFT source and receiver wavefields in the wavenumber domain; computing a reflection angle θ and an azimuth angle φ of the source wavefield $p_F$ and receiver wavefield $p_B$ in the wavenumber domain; calculating the ADCIGs in the wavenumber domain; and applying an inverse fast Fourier transform (FFT) to determine the ADCIGs in the space domain.

20 Claims, 19 Drawing Sheets

DEVICE AND METHOD FOR CALCULATING 3D ANGLE GATHERS FROM REVERSE TIME MIGRATION

CROSS REFERENCE TO RELATED APPLICATIONS

This application claims priority and benefit from U.S. Provisional Patent Application No. 61/386,099, filed Sep. 24, 2010, for "3D Angle Gathers from Reverse Time Migration", the entire contents of which are incorporated in their entirety herein by reference.

BACKGROUND

1. Technical Field

Embodiments of the subject matter disclosed herein generally relate to methods and systems and, more particularly, to mechanisms and techniques for more efficiently providing an accurate image of a subsurface structure.

2. Discussion of the Background

During the past years, the interest in developing new oil and gas production fields has dramatically increased. However, the availability of land-based production fields is limited. Thus, the industry has now extended drilling to offshore locations, which appear to hold a vast amount of fossil fuel. Offshore drilling is an expensive process. Thus, those undertaking the offshore drilling need to know where to drill in order to avoid a dry well.

Marine seismic data acquisition and processing generate a profile (image) of the geophysical structure under the seafloor. While this profile does not provide an accurate location for the oil and gas, it suggests, to those trained in the field, the presence or absence of oil and/or gas. Thus, providing a high resolution image of the structures under the seafloor is an ongoing process.

During a seismic gathering process, as shown in FIG. 1, a vessel 10 drags an array of acoustic detectors 12 that are provided on cable 14; the detectors 12 and the cable 14 are known as a streamer 16; the vessel 10 may drag plural streamers. The streamers may be disposed horizontally, i.e., lying at a constant depth Z1 relative to a surface 18 of the ocean. The vessel 10 also drags a sound source assembly 20 that is configured to generate an acoustic wave 22a. The acoustic wave 22a propagates downwards toward the seafloor 24 and penetrates the seafloor until eventually a reflecting structure R (reflector), on layer interface 26, reflects the acoustic wave. The reflected acoustic wave 22b propagates upwardly until it is detected by detector 12. Another reflected acoustic wave 22c propagates upwardly to the surface 18 and is then reflected back, 22d, to be detected by detector 12. The recorded data related to the detected waves is then processed for producing an accurate image of the subsurface. The processing includes various phases, e.g., velocity model determination, prestack, migration, poststack, etc., which are known in the art and thus, their description is omitted herein.

Progress in prestack depth imaging has been considerable in the past. The theoretical progress has provided better methods for extrapolating wavefields measured at the earth's surface into the subsurface, and the practical progress has linked the migrations more closely with velocity model building and interpretation. Migration is the process of propagating, for example, a wavefield measured at a receiver location to a reflector located in the subsurface. The migration may also be applied to wavefields generated by a source.

In complex subsurface areas, imaging difficulties are due to two components: prestack depth velocity model building and migration algorithms. Velocity model building estimates a velocity model (e.g., how the sound wave propagates through the various layers of the earth) for the simulation of seismic wave propagation that takes place during migration. This model forms the long wavelength (macro) part of the earth model, and the migration provides the short wavelength (reflectivity) part. Seismic ray-based tomography is a widely used tool for model building, but the nonlinearity and uncertainty of the ray-based tomography algorithms exposes tomography as a weak link in the imaging process.

Another weak link in the imaging process is the poor seismic illumination of regions beneath the complex overburden (e.g., salts, overthrusts structures, etc.), which makes adequate imaging difficult or even impossible. The overburden Poor illumination is often caused by inadequate seismic acquisition, for example, by conventional 3D narrow azimuth streamer acquisition when 3D wide azimuth acquisition is needed.

Until recently, Kirchhoff migration has been the workhorse method for prestack depth migration. This method has proven successful over numerous examples when the velocity variations are minor. This method has also formed the basis for the "true-amplitude" migration. This algorithm migrates the input seismic data one trace at a time or one local group of traces at a time; these processes imply that the cost of Kirchhoff migration is proportional to the number of input traces. However, when the number of input traces is relatively small within the migration aperture (as is usually the case with marine narrow azimuth surveys), Kirchhoff migration yields an efficient algorithm. On the contrary, when the number of input traces is large within the migration aperture (as is usually the case with marine wide azimuth surveys), efficiency might be lost as the computational task becomes demanding.

Also, using raytracing to approximate the Green's function of wave propagation may compromise the accuracy of Kirchhoff migration, especially when the wavefield is complicated. A traditional approximation, e.g., choosing a single ray arrival of the complicated wavefield at each image location, determines a noisy image in areas where there are many ray arrivals. Multi-arrival Kirchhoff migration algorithms overcome this problem, but they tend to be complicated and relatively inefficient in 3 dimension (3D).

According to other approaches, beam prestack depth migration methods approximate the Green's function with an expression that allows multiple arrivals to be imaged without excessive algorithmic complication, and it can be applied in a true-amplitude sense. As for Kirchhoff migration, however, the Green's function approximation used by beam migration relies on ray tracing and can become inaccurate if the migration velocity model contains extremely strong variations (e.g., salt bodies) and requires excessive smoothing. Still, the beam migration's ability to image complex structures and to control certain types of migration noise can usually ensure significantly better images in complex areas than single arrival Kirchhoff migration algorithms.

While Kirchhoff and beam migration methods use rays to approximate the Green's functions for wave propagation, so-called wave-equation migration algorithms use full waveform Green's functions that are numerically generated, for example by finite differences. The most computationally efficient algorithms for doing this are collectively called one-way wave equation migration (OWEM). These algorithms decompose seismic wavefields inside the earth into up-going waves and down-going waves under the assumption of no interaction between these two wavefields; that is, no turning wave and vertical reflection generation during the synthesis of wave propagation. Over a very large and growing body of examples, OWEM has solved the problems of multi-arrivals better than single arrival Kirchhoff migration. For wide azimuth seismic surveys, where the number of input traces is large compared with the migration aperture, OWEM tends to gain efficiency relative to Kirchhoff migration. For such surveys, efficient implementation of OWEM algorithms can be built either for common shot migration or for plane wave migration.

However, there are some major limitations of OWEM algorithms. First, turning waves are missing in the wave propagation synthesis, which results in the high dip events around 90° being poorly imaged; second, the wave propagation synthesis only ensures the accuracy of the phase of the wavefield, while amplitudes of the wavefield are much less reliable and need further correction.

Use of the two-way wave equation in depth migration began some time ago in an algorithm called reverse-time migration (RTM). However, this approach was limited due to its need for computer power. With increases in computer power, RTM has developed rapidly over the last few years, and theoretical advantages such as dip-unlimited accurate wave propagation and improved amplitudes have provided imaging benefits in practice. For example, in complex subsalt and salt flank areas, the numerical Green's functions from finite difference to the two-way wave equation have better amplitude behavior, so it is easier to incorporate amplitude corrections into RTM than into OWEM. In addition to its ability to handle complex velocities distributions, many current RTM algorithms can handle anisotropic media such as vertical transverse isotropy (VTI) and tilted transverse isotropy (TTI). On real data imaging examples, TTI RTM has given the best images in a complex Gulf of Mexico wide azimuth survey, though the velocity models for TTI migration were simplified as structurally conformable transversely isotropy (STI), which requires the anisotropic symmetric axis consistent with the reflectors' normal vectors.

With the improved accuracy of RTM comes increased sensitivity to the accuracy of the velocity model. This sensitivity causes notable improvement in RTM images when the velocity model is accurate, but it also causes notable degradation of RTM images when the velocity model is not accurate. For this reason, migration velocity analysis is more important for RTM than it is for other depth migration methods.

The link between migration and velocity model building is a set of common image gathers (CIGs) produced by the migration algorithms. A CIG is a set of images, all at the same image location (usually at the location of the reflector in the subsurface), with each image formed from different subsets of input data. For example, a single common offset/common azimuth data volume, which is a subset of the full acquired prestack seismic data set, can be used to 3D image the earth. The collection of images from all the sub-datasets with different offset and azimuth forms the CIGs. The CIGs include plural traces. The CIGs can have all traces with different offsets (with all the azimuthal information summed together), or the CIGs can have all traces with different offsets and azimuths.

The CIGs are commonly used for depth domain amplitude variation with offset (AVO) analysis, and migration-based velocity analysis. With a correct velocity model, all the images at the same image location should focus at the same depth, causing reflection events on the CIGs to appear flat. The flatness of seismic events on CIGs is one of the criteria for validating the velocity model by focusing analysis. When events on the CIGs are not flat, geophysicists improve their migration velocity models by analyzing the curvature of the events, using the analysis to guide a velocity update.

For Kirchhoff migration, there is no significant additional cost to compute common offset CIGs (COCIGs). On the other hand, migrating common-offset volumes by OWEM or RTM is expensive, so COCIGs are not generally available for those migration methods.

The quality limitations of COCIGs are caused, in part, by the underlying limitations of ray-based migration. More fundamentally, COCIGs suffer from migration artifacts due to multiple paths of wave propagation, whether or not the migration methods are capable of handling multiple paths of wavefield accurately, potentially causing difficulties for velocity analysis and amplitude versus reflection angle (AVA) analysis. In fact, CIGs whose traces are indexed by any attribute on the recording surface, such as source/receiver offset or surface incidence angle of the source energy, are susceptible to such artifacts. In this regard, it was showed that a necessary condition for artifact-free CIGs is to be parameterized in a subsurface angle domain, such as in a reflection angle or opening angle. This was illustrated in 2D using multi-arrival Kirchhoff migration on the Marmousi synthetic dataset and subsequent work has extended this showing to anisotropic media, or 3D using CIGs in reflection angle/azimuth angle, and to 3D analysis in multiple angle domain (reflection angle, dip angle, azimuth angle etc.).

Compared with multi-arrival Kirchhoff and beam migrations, OWEM and RTM appear to have limited capabilities for CIGs indexed in the surface offset domain. In the subsurface angle domain, an approach was proposed that outputs local subsurface offset CIGs from OWEM and then convert them to subsurface (reflection) angle domain CIGs (ADCIGs). Converting local subsurface offset CIGs into ADCIGs has a simple form in the 2D isotropic case. This approach requires the migration imaging condition to be applied at a range of subsurface offsets, forming subsurface offset CIGs; next, a 2D Fourier transform is applied to the local offset CIG; then the transform wavenumber is mapped to the reflection angle. The procedure is performed gather by gather locally, and it is a reasonably efficient algorithm.

However, the gather conversion formula is complex in 3D as it requires producing the local subsurface offset CIGs indexed by offset X and offset Y, and a 5D Fourier transform to the local subsurface offset CIGs to the wavenumber domain, followed by a high dimensional mapping. For implementation, even producing a local subsurface offset vector (X, Y) CIGs from OWEM is computationally intensive. An alternative approach is to produce time delay CIGs, then to convert them to ADCIGs. The time delay CIG has only one additional axis on the images (delay time). An output of time delay CIG is 4D (x, y, z, delay time). However, for wide azimuth seismic data, the expected 3D ADCIGs are themselves 5D (x, y, z, and incident/reflection angle, azimuth angle), so the time shift imaging condition does not provide sufficient information for a full conversion into 3D ADCIGs when applied to wide azimuth seismic data. As a result, the final angle gathers generally lack azimuthal information. Furthermore, the conversion from one data domain to another suffers from sampling issues, possibly degrading the resolution of the final CIGs.

The above approaches to obtain ADCIGs for OWEM and RTM are indirect, proceeding through an intermediate (subsurface offset or image time lag) domain. It is also possible to compute ADCIG's by directly decomposing the wavefields in the subsurface into their local directional components. So far, this work has been performed on 2D or 3D isotropic migration algorithms, and produces ADCIGs only in the reflection angle (no azimuth). Further, this approach has been applied only to one-way wavefield propagators, making it difficult to retain reliable amplitude information. Although there are other differences between the propagators for OWEM and RTM, there is no essential strategic difference in the algorithms for CIG output.

Accordingly, it would be desirable to provide systems and methods that avoid the afore-described problems and drawbacks.

SUMMARY

According to one exemplary embodiment, there is a method for calculating, in a computing device, angle domain common image gathers (ADCIGs) for use in generating a final image of a subsurface of the earth. The method includes a step of calculating with wavefield forward propagation, in a time-space domain, a source wavefield $p_F$ of a seismic source; a step of calculating with wavefield back propagation, in the time-space domain, a receiver wavefield $p_B$ of a seismic receiver configured to detect a seismic wave generated by the seismic source; a step of applying an algorithm of anti-leakage Fourier transform (ALFT) to transform the source wavefield $p_F$ to a wavenumber domain; a step of applying the ALFT algorithm to the receiver wavefield to transform the receiver wavefield in the wavenumber domain; a step of determining an imaging condition to the ALFT source and receiver wavefields in the wavenumber domain; a step of computing a reflection angle θ and an azimuth angle φ of the source wavefield $p_F$ and receiver wavefield $p_B$ in the wavenumber domain; a step of calculating the ADCIGs in the wavenumber domain; and a step of applying an inverse fast Fourier transform (FFT) to determine the ADCIGs in the space domain.

According to another exemplary embodiment, there is a computer readable medium including computer executable instructions, wherein the instructions, when executed, implement a method for calculating angle domain common image gathers (ADCIGs) for use in generating a final image of a subsurface of the earth. The method includes the steps noted above.

According to still another exemplary embodiment, there is a processing device configured to calculate angle domain common image gathers for use in generating a final image of a subsurface of the earth. The processing device includes an interface configured to receive seismic data and a processor connected to the interface. The processor is configured to calculate with wavefield forward propagation, in a time-space domain, a source wavefield $p_F$ of a seismic source, calculate with wavefield back propagation, in the time-space domain, a receiver wavefield $p_B$ of a seismic receiver configured to detect a seismic wave generated by the seismic source, apply an algorithm of anti-leakage Fourier transform (ALFT) to transform the source wavefield $p_F$ to a wavenumber domain, apply the ALFT algorithm to the receiver wavefield to transform the receiver wavefield in the wavenumber domain, determine an imaging condition to the ALFT source and receiver wavefields in the wavenumber domain, compute a reflection angle θ and an azimuth angle φ of the source wavefield $p_F$ and receiver wavefield $p_B$ in the wavenumber domain, calculate the ADCIGs in the wavenumber domain, and apply an inverse fast Fourier transform (FFT) to determine the ADCIGs in the space domain.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology of source wavefields, receiver wavefields, common image gathers, and reverse time migration for processing seismic data. However, the embodiments to be discussed next are not limited to these methods and concepts, but may be applied to other methods for producing final images of the subsurface.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, RTM produces artifact-free CIGs both for velocity updating and amplitude analysis, and these CIGs should contain, not suppress, azimuthal information. Such CIGs may be indexed by reflection angle/azimuth angle, and the CIGs may be obtained by performing a wavefield directional decomposition at locations in the subsurface. These CIGs, called 3D angle domain CIGs, can be produced in an isotropic medium or in a STI anisotropic medium.

In another exemplar embodiment, the forward propagated source wavefields and back propagated receiver wavefields are transformed to the wavenumber domain. The spatial wavenumber vectors thus provide the phase direction of wave propagation. In one application, in order to reduce the numerical cost, the CIGs are formed in a local window, equivalent to a local plane wave decomposition.

In still another exemplary embodiment, an anti-leakage Fourier transform (ALFT) is used to replace the fast Fourier transform (FFT). The ALFT algorithm helps to reduce the Gibbs phenomenon which causes severe accuracy problems when working in a small local window. Furthermore, the ALFT outlines the local plane waves by their energy, which can be used for limiting the number of most energetic plane waves in the convolution imaging condition instead of using the full set of them. This scheme helps to notably reduce the computational cost as discussed next.

Figure 1:
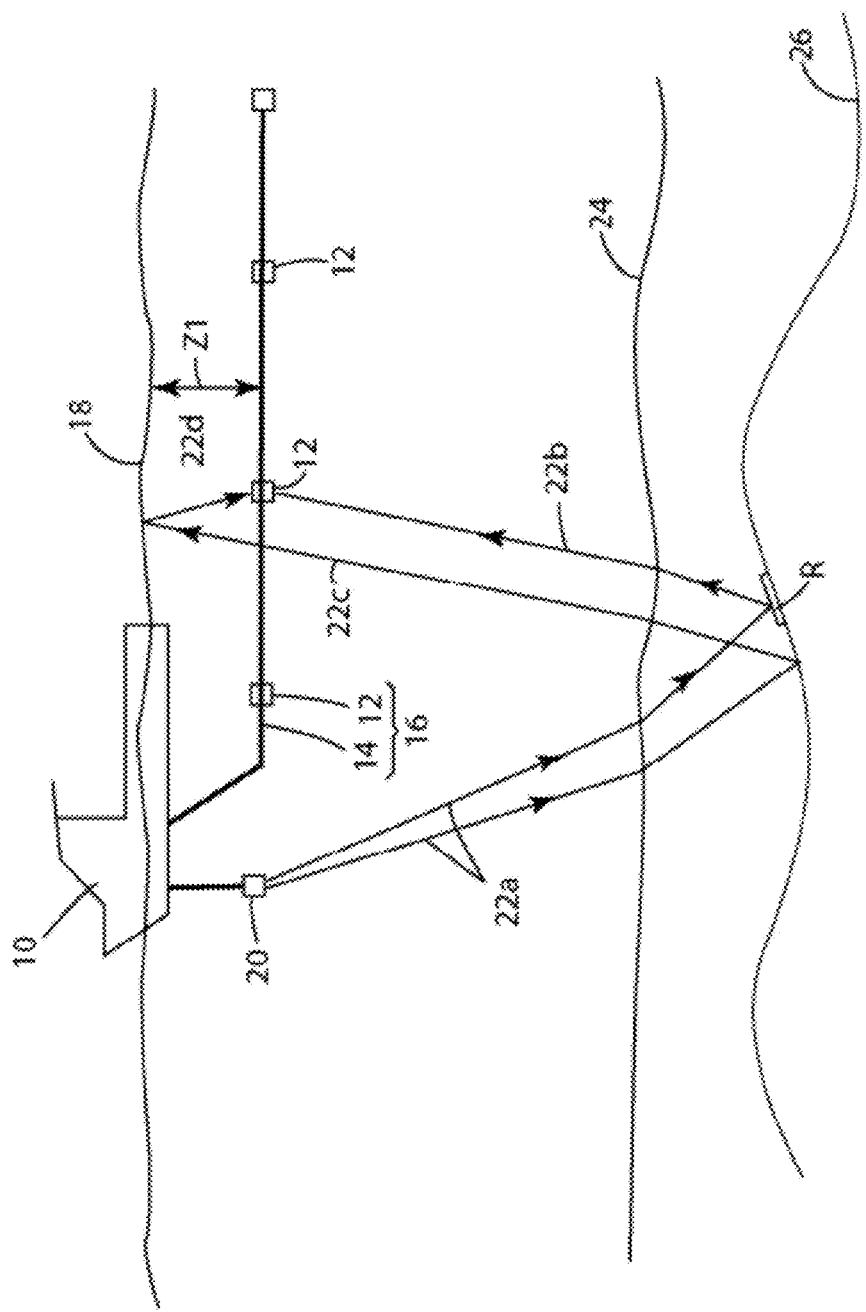
FIG. 1 is a schematic diagram of a conventional data acquisition setup.
Figure 2:
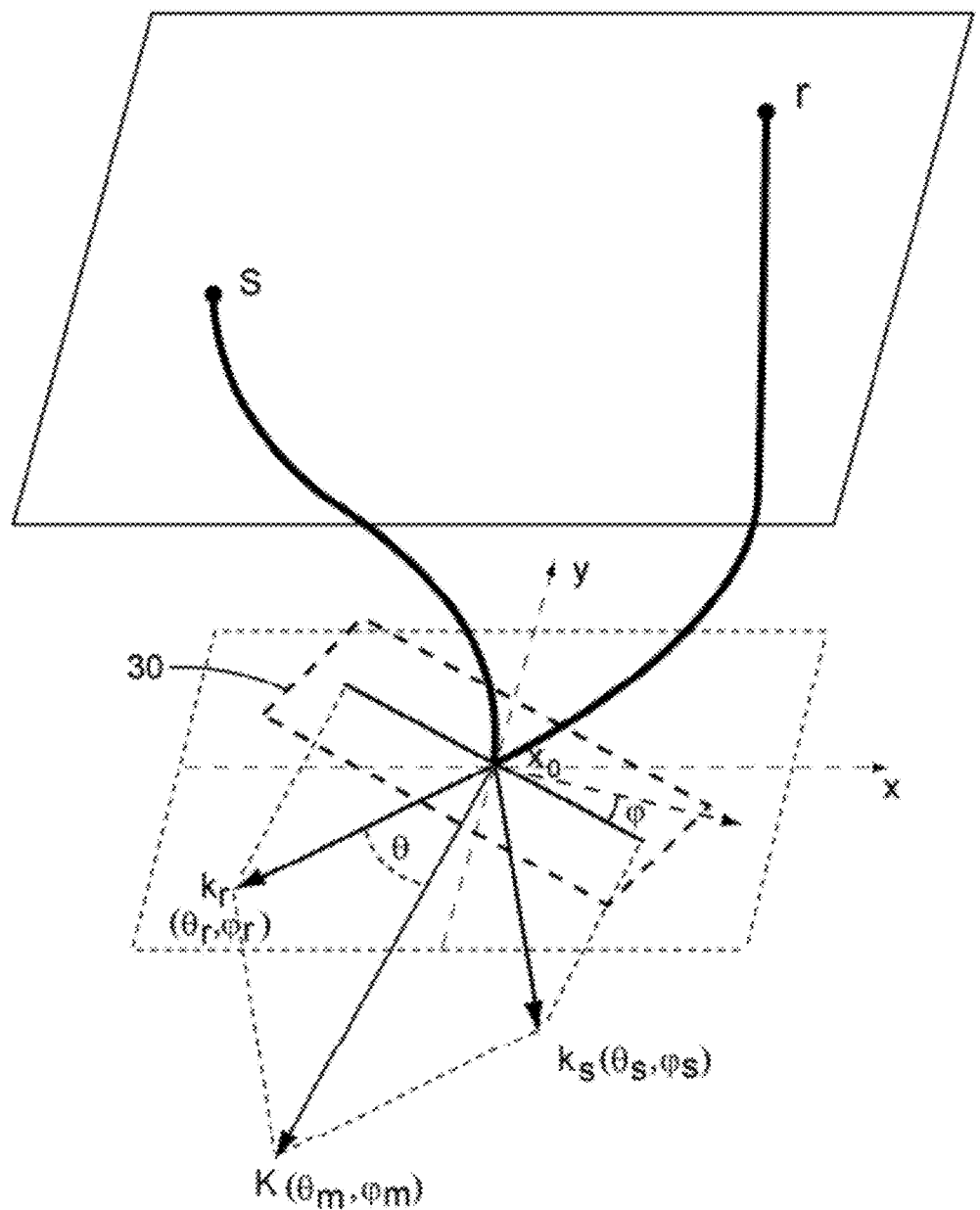
FIG. 2 is a schematic diagram indicating the definition of a reflection angle θ and a local subsurface azimuth angle φ.

Prior to discussing the novel methods, a review of the formulation for 3D true-amplitude migration with subsurface angle gather output is believed to be in order. This formulation yields an asymptotic formula that is used later for applying to RTM. For the acoustic wave equation, the reflectivity R at subsurface location x (bold symbols represent a vector) depends on a reflection angle $\theta$ and a local subsurface azimuth angle $\phi$ as shown in FIG. 2. Thus, the reflectivity R depends with the location x, reflection angle and azimuth angle as $R=R(x, \theta, \phi)$. FIG. 2 also shows a position s of a source and a position r of a receiver. The source at s may any known source, e.g., gun source or EM source, and the receiver at r may be any know receiver, e.g., geophone, hydrophone, etc. The wavenumber vectors $k_s$ and $k_r$ are defined as the wave propagation phase directions at image location x for the wavefields from the source location s and the receiver location r respectively. The angle pairs $(\theta_s, \phi_s)$, $(\theta_r, \phi_r)$, and $(\theta_m, \phi_m)$ are, respectively, the dip angles and azimuth angles of vectors $k_s$, $k_r$, and their vector sum k, respectively. By Snell's law, the plane orthogonal to vector k is a potential reflector plane (which coincides with an actual reflector when $k_s$ and $k_r$ form a specular wavenumber pair). The angle relationships are defined as:

$$\begin{cases} \cos\theta = \dfrac{k \cdot k_r}{|k||k_r|} \\ \cos\varphi = \dfrac{(k_s \times k_r) \cdot (n_x \times (k_s + k_r))}{|k_s \times k_r||n_x \times (k_s + k_r)|} \end{cases} \quad (1)$$

The unit vector is defined as $n_x=(1, 0, 0)$. In equation (1), the definitions of the $\theta$ and $\phi$ angles are for a general case, which is applicable to isotropic, VTI and TTI media. The Kirchhoff approximation for seismic synthesis in forward modeling states that, in the frequency domain, the recorded wavefield $\delta G(r, \omega, s)$ at location r due to a source at location s, is given by:

$$\delta G(r,\omega,s) = \int dx R(x,\theta,\phi) \cdot (\nabla G_0(r,\omega,x) G_0^*(x,\omega,s) - G_0(r,\omega,x) \nabla G_0^*(x,\omega,s)), \quad (2)$$

where $G_0(x, \omega, s)$ is the Green's function in the frequency domain for propagation in the background medium from the location s to the location x, mathematical operation "*" denotes the complex conjugate, $R(x, \theta, )=R(x, \theta, )$n with $R(x, \theta, )$ being angle-dependent reflectivity and n the vector normal to the reflection plane, and $\nabla$ is the spatial gradient operator. The integral over the full spatial volume is the sum of incremental reflectivity contributions from all subsurface locations x. Asymptotically, the Green's function can be expressed as $$G_0(r,\omega,x) = A(r,x) e^{i\omega T(r,x)}, G_0(x,\omega,s) = A(x,s) e^{-i\omega T(x,s)}, \quad (3)$$

and the gradient of the asymptotic Green's function is given by $$\nabla G_0(x,\omega,s) = -i\omega \nabla T(x,s) A(x,s) e^{-i\omega T(x,s)}. \quad (4)$$

In equations (3) and (4), $T(x, y)$ and $A(x, y)$ are the traveltime and ray amplitude from the location y to x, respectively. As a result, the reflected wavefield in equation (2) can be expressed as:

$$\begin{aligned} \delta G(r, \omega, s) &= i\omega \int dx R(x, \theta, \varphi) n \cdot (\nabla T(r, x) + \nabla T(x, s)) A(r, x) \\ & \quad A(x, s) e^{i\omega(T(r,x)+T(x,s))} \\ &= i\omega \int dx R(x, \theta, \varphi) n \cdot q(r, x, s) A(r, x, s) e^{i\omega T(r,x,s)} \\ &= \int dx R(x, \theta, \varphi) K(r, x, s, \omega) e^{i\omega T(r,x,s)}, \end{aligned} \quad (5)$$

where the Kirchhoff integral kernel $K(r, x, s, \omega) = i\omega n \cdot q(r, x, s) A(r, x, s)$ contains a migration dip vector term $q(r, x, s) = \nabla T(r, x) + \nabla T(x, s)$. In the isotropic case, the migration dip vector can also be expressed as $$q(r, x, s) = \frac{2\cos\theta}{v(x)} n,$$

where $\theta$ is the incident angle, and $v(x)$ is the wave propagation velocity at image location x. This dip vector is combined with an amplitude product term $A(r, x, s) = A(r, x) A(x, s)$ in the migration kernel. It is noted that equation (5) is valid only with the high frequency asymptotic approximation. The phase term is the summation of the traveltimes of the wavefields at the image point from the source location and the receiver location:

$$T(r,x,s) = T(r,x) + T(x,s) \quad (6)$$

If there is an observed seismogram $\delta G_{obs}(r, \omega, s)$ at a location r due to a source at the location s, this observed data should be consistent with the synthesized reflection data $\delta G(r, \omega, s)$. This consistency requires that the background velocity model and the reflectivity model both be correct. This assumption of the true amplitude migration implies that the obtained background velocity gives a reasonable estimate to the long wavelength variations of the earth model, so that the traveltime of wave propagation is well defined. The task of the inversion is to find a good reflectivity model to achieve a fit between the observed data $\delta G_{obs}(r, \omega, s)$ and the synthetic data $\delta G(r, \omega, s)$. Using a weighted least-squares inversion scheme, an objective function can be generated to measure a misfit between the calculated data $\delta G(r, \omega, s)$ and the acquired/observed data $\delta G_{obs}(r, \omega, s)$ as follows:

$$C(R) = \frac{1}{2} \int\int\int ds\, dr\, d\omega\, Q\|\delta G_{obs} - \delta G\|, \quad (7)$$

where $\|\cdot\|$ denotes an $L_2$ norm and $Q=Q(x, \theta, s, r)$ is the weight for the least-squares inversion. This weight need to be determined. Minimizing the misfit function (7) gives the least-squares solution for the reflectivity model $R(x, \theta, \phi)$. This solution is the so-called true or preserved amplitude migration image, or migration/inversion image.

From equation (5), it is noted that the synthetic data $\delta G(r, \omega, s)$ depends linearly with the reflectivity model $R(x, \theta, \phi)$, and equation (7) places the problem to be solved into a framework of linear inversion theory. Solving equation (7) for reflectivity $R(x, \theta, \phi)$ at specific angles $\theta_0$ and $\phi_0$ produces $R(x, \theta_0, \phi_0)$. $R(x, \theta_0, \phi_0)$ can be performed iteratively using a Gauss-Newton method, whose first iteration solution (assuming a null initial reflectivity guess) yields the angle dependent reflectivity model:

$$R(x, \theta_0, \varphi_0) = -\left[\frac{\partial^2 C}{\partial R^2}\right]^{-1} \frac{\partial C}{\partial R}. \quad (8)$$

On the right hand side of equation (8), the first term is the inverse of the Hessian and the second term is the gradient of the objective function. The gradient of the objective function has the expression:

$$\frac{\partial C}{\partial R}(x, \theta_0, \varphi_0) =$$
$$\int\int\int ds\, dr\, d\omega\, \delta(\theta - \theta_0)\delta(\varphi - \varphi_0) Q K^*(r, x, s, \omega) e^{-i\omega T(r,x,s)} \delta G_{obs}, \quad (9)$$

where the two $\delta$ functions ($\delta(\theta-\theta_0)$ and $\delta(\phi-\phi_0)$) are angle binning functions that restrict the integration to desired reflection angle $\theta_0$ and azimuth angle $\phi_0$. The Hessian $$\left[\frac{\partial^2 C}{\partial R^2}\right]$$

has the expression:

$$\left[\frac{\partial^2 C}{\partial R^2}\right] = H(x, x_0, \theta_0, \varphi_0) \quad (10)$$
$$= \int\int\int d\omega\, ds\, dr\, \delta(\theta - \theta_0)\delta(\varphi - \varphi_0) K^*(r, x, s, \omega)$$
$$QK(r, x_0, s, \omega) e^{-i\omega(T(r,x,s)-T(r,x_0,s))}$$
$$\approx \int\int d\theta\, d\varphi\, \delta(\theta - \theta_0)\delta(\varphi - \varphi_0) \int dk\, K^*(r, x, s, \omega) QK$$
$$(r, x_0, s, \omega) \left|\frac{\partial(\omega, s, r)}{\partial(\theta, \varphi, k)}\right| e^{-ik\cdot(x-x_0)},$$

where x is the true focus location and $x_0$ is the focus location with the background velocity model. The second step of equation (10) is the result of changing integration variables from surface coordinates (s, r) to subsurface angles ($\theta, \phi$) and the Jacobian $$\left|\frac{\partial(\omega, s, r)}{\partial(\theta, \varphi, k)}\right|$$

is the result of this change of variables.

The approximation in equation (10) is valid when the high frequency asymptotic approximation $\omega(T(r, x, s)-T(r, x_0, s))\approx k\cdot(x-x_0)$ holds. When the background velocity model is close enough to the true velocity model, the Green's function on the $x_0$ and x are very close within the band of seismic frequencies. Therefore, in the first order approximation under a high frequency asymptotic approximation, the amplitude kernel could be approximated as:

$$K(r,x,s,\omega) \approx K(r,x_0,s,\omega). \quad (11)$$

Then, as long as the least-squares weight satisfies $$Q \approx \frac{-1}{(2\pi)^3 K^2(r, x_0, s, \omega)} \left|\frac{\partial(\theta, \varphi, k)}{\partial(\omega, s, r)}\right|, \quad (12)$$

the right-hand side of equation (10) can be made asymptotically equivalent to the Dirac delta function:

$$\delta(x - x_0) = \frac{1}{(2\pi)^3} \int dk\, e^{-ik\cdot(x-x_0)}. \quad (13)$$

In this case, the Hessian becomes a diagonal matrix:

$$H(x,x_0,\theta_0,\phi_0) = \delta(x-x_0). \quad (14)$$

The Jacobian in equation (10) includes the Beylkin determinant. This determinant provides the connection between local direction vectors at an image location and the actual acquisition geometry. For wide azimuth acquisition, in the cases of isotropic media, it can be developed as:

$$\left|\frac{\partial(\theta, \varphi, k)}{\partial(\omega, s, r)}\right| = \frac{\omega^2|q|^3(4\pi)^4 v^2(x) A^2(x, s) A^2(x, r) p_z^s p_z^r}{4\cos\theta\sin\theta}, \quad (15)$$

where $v(x)$ is the velocity at image point x and $p_z^s$ is the vertical component of slowness vector of the wave propagation at surface. With the help of equation (15), the weight Q of the least-squares inversion becomes:

$$Q \approx \frac{16\pi v(x) p_z^s p_z^r}{\sin\theta}. \quad (16)$$

Note that this weight function does not depend directly on the wavefield amplitude. This regular production comes from the wide azimuth acquisition geometry. In general though, the weight depends, through the Beylkin determinant, on the deviation of the acquisition geometry from the ideal wide-azimuth, wide-offset case. Wide-azimuth acquisition covers (in principle) the earth's surface completely with an areal array of receivers to record energy from each shot and an areal array of shots to send the energy to be recorded at each receiver. As a result of this, the weight (16) has lost the dependence on wavefield amplitude which is used to compensate for insufficient acquisition, so it is different from the traditional common offset migration weight.

Substituting equations (9), (14), and (16) into equation (8) provides the following asymptotic form for 3D wide azimuth true amplitude migration with output ADCIGs:

$$R(x, \theta_0, \varphi_0) = \iiint \delta(\theta - \theta_0)\delta(\varphi - \varphi_0) ds \qquad (17)$$
$$dr d\omega \frac{32\pi i \omega \cos\theta A(s, x, r) p_z^s p_z^r e^{-i\omega T(r,x,s)} \delta G_{obs}}{\sin\theta},$$

which gives 3D true amplitude Kirchhoff migration for ADCIGs in both the reflection angle and the azimuth angle. However, the above inversion formula has a singularity at $\theta=0°$, which is different from its 2D inversion counterpart.

To understand why this singularity happens, assume that the reflection and azimuth angles are distributed on a hemisphere as latitude and longitude, respectively. $\theta=90°$ gives the equator, with all the azimuths equally distributed on it. $\theta=0°$ is the north pole where the azimuth angle is ambiguously defined. The $1/\sin\theta$ term in the above imaging condition is used to compensate for the diminishing area when the reflection angle tends to $0°$. However, this causes difficulties in obtaining accurate amplitudes around $0°$ reflection angle. The reason of this difference is due to the direct binning function $\delta(\phi-\phi_0)$.

The 3D true amplitude migration for reverse time migration is now determined. The true amplitude migration expression (17) provides a recipe for producing 3D ADCIGs in reflection angle and azimuth angle. However, this expression is an asymptotic expression, and it can be applied directly only to migration algorithms that calculate amplitude terms explicitly and rely on specified initial directions, that is, to Kirchhoff and beam migrations. To apply the theory to RTM, it is necessary to translate expression (17) into a true amplitude RTM formula. The resulting RTM formula will still be asymptotic in terms of amplitude, even though the underlying wave propagation engine is not. To simplify its derivation, it is considered the isotropic RTM (the anisotropic case can be treated similarly, with extra complications in notation). It is also considered decomposing the full migration in expression (17) into migration shot by shot.

If the multiple reflections are ignored, the RTM migration operator is linear to input data $\delta G_{obs}$, and the final wide-azimuth output is the sum of contributions from all the shot experiments. To produce a true-amplitude formula for RTM, the asymptotic expressions for Green's function (amplitude and traveltime terms) are replaced with their exact counterparts. This is achieved by rewriting the migration expression (17) as:

$$\overline{R}(x, \theta_0, \varphi_0) = 16\pi \iiint \frac{v(x)}{\sin\theta}\delta(\theta-\theta_0)\delta(\varphi-\varphi_0) p_F p_B ds d\omega. \qquad (18)$$

Here, $\overline{R}(x, \theta_0, \phi_0) = R(x, \theta_0, \phi_0)/|q| = R(x, \theta_0, \phi_0)v(x)/2\cos\theta_0$ is introduced to maintain a consistency with an output definition in a traditional method. The integral over source locations ensures that all recorded seismic traces contribute to the final image and to the angle gathers. The wavefields $p_F$ and $p_B$ are given by:

$$p_F = G^*(x,s) p_z^s, p_B = \int dr G^*(x,r) p_z^r \delta G_{obs}. \qquad (19)$$

The forward propagation of the source signature (source wave field), $p_F$, satisfies:

$$\begin{cases} \left(\frac{1}{v^2}\frac{\partial^2}{\partial t^2} - \nabla^2\right) p_F(x;t) = 0, \\ p_F(x, y, z=0; t) = \delta(x-s)\int_{-\infty}^{t} f(t') dt'. \end{cases} \qquad (20)$$

In equation (20), the time integration of the source wavelet $f(t)$ incorporates the term $p_z^s$ into $p_F$. The back propagation (receiver wavefield) of the recorded data $p_B$ satisfies the equation:

$$\left(\frac{1}{v^2}\frac{\partial^2}{\partial t^2} - \nabla^2\right) p_B(x;t) = 0, \qquad (21)$$
$$p_B(x, y, z=0; t) = \delta G_{obs}(x, y; s; t).$$

In equations (20) and (21), $v=v(x)$ is the velocity, $\delta(x-s)f(t)$ is the source signature, and $\nabla^2$ is the Laplacian operator.

The final integral of equation (18) over shot locations s is the sum of all the contributions for all the shots. For a single shot, the contribution to the final 3D-angle CIGs is $$\overline{R}_s(x, \theta_0, \varphi_0) = 16\pi \int \frac{v(x)}{\sin\theta}\delta(\theta-\theta_0)\delta(\varphi-\varphi_0) p_F p_B d\omega. \qquad (22)$$

Of the two known migration imaging conditions, cross-correlation (multiplication of wave fields) and deconvolution (division of wave fields), it is believed that the cross-correlation imaging condition is appropriate for 3D ADCIGs. Equation (22), and its ray-theoretic counterpart (17), both have the form of a cross-correlation imaging condition, which is easy to apply and numerically stable.

In expression (22), the forward propagated wave fields and backward propagated wavefields are in a general form, applicable to any wave equation based migration, OWEM or RTM. The migration formula has a simple form that is independent on the velocity model, isotropic or STI anisotropic.

To create ADCIGs from RTM, equation (18) needs the subsurface wavefields $p_F$ and $p_B$ from equations (20) and (21). Once these wavefields have been computed, the (local) wave propagation directions $k_s$ and k are determined at each image location. Then equation (1) provides the reflection angle $\theta$ and azimuth angle $\phi$. The imaging condition in the frequency/wavenumber domain for the full stack is given by:

$$\overline{R}_s(x, \theta_0, \varphi_0) = \qquad (23)$$
$$\frac{16\pi v}{\sin\theta_0} \sum_\omega \sum_k \sum_{(k_r-k_s)} \delta(\theta-\theta_0)\delta(\varphi-\varphi_0) p_F(k_s, \omega) p_B(k_r, \omega) e^{ik\cdot x}.$$

This equation expresses the reflectivity for each opening/azimuth angle as a sum of wave field contributions over a range of dip/azimuth angles that obey the law of reflection. Contributions from dip/azimuth angles that do not agree with those contributions of an actual reflector tend to cancel out by the integral summation. In order to improve the efficiency of the calculations, this expression is rewritten in the wavenumber domain as:

$$I_s(k, \theta_0, \varphi_0) = \sum_\omega \sum_{(k_r - k_s)} \delta(\theta - \theta_0)\delta(\varphi - \varphi_0) p_F(k_s, \omega) p_B(k_r, \omega). \quad (24)$$

Then, equation (23) can be expresses as:

$$\overline{R}_s(x, \theta_0, \varphi_0) = \frac{16\pi v(x)}{\sin\theta_0} \sum_k I_s(k, \theta_0, \varphi_0) e^{ik \cdot x}. \quad (25)$$

The summation over frequency in equation (24) provides an imaging condition appropriate for RTM. Equation (25) is used to compute the angle dependent reflectivity by a 3D spatial inverse Fourier transform.

Figure 3:
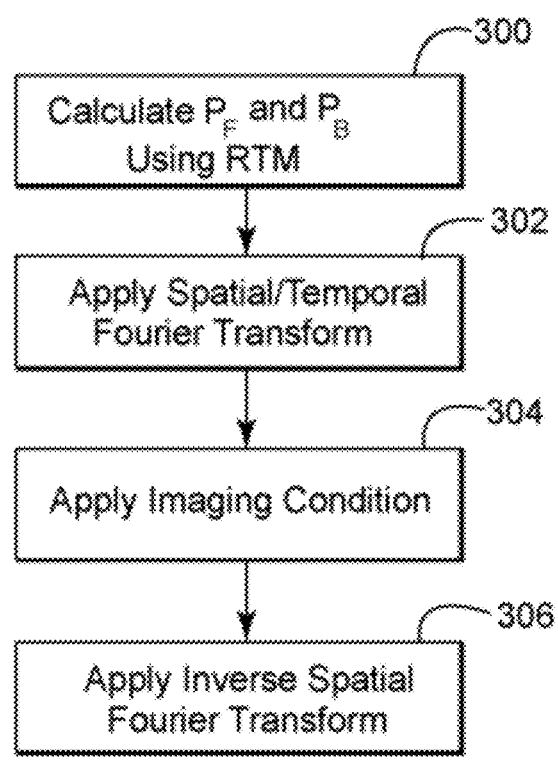
FIG. 3 is a flowchart illustrating a method for calculating common image gathers.

The following steps illustrated in FIG. 3 summarize the novel procedure discussed above. In step 300, calculate the wavefields $p_F$ and $p_B$ using an RTM wave propagation engine. The wavefields from the source location are forward propagation (in time) of a boundary source condition; the wavefields from the receiver locations are a backward propagation (in time) of the pre-filtered acquired seismic data. All wavefields may be stored on a local disk. In step 302, a 4D spatial/temporal Fourier transform is applied to both the source and receiver wavefields (forwards in time for the source wavefield, backwards in time for the receiver wavefield) to express the wavefields in the frequency/wavenumber domain. This 4D transform may include various other steps that are discussed later. In step 304, the imaging condition (24) is applied to the wavefields to decompose the image by reflection angle $\theta$ and azimuth angle $\phi$, according to equation (1). In step 306, a 3D inverse spatial Fourier transform is applied to $I_s(k, \theta_0, \phi_0)$ to obtain the 3D ADCIG $\overline{R}_s(x, \theta_0, \theta_0)$ using equation (25).

The proposed algorithm is computationally intensive because the imaging condition (24) is a convolution over the three-dimensional wave vectors from both the source side and the receiver side. Inside the convolution loop, there is a binning process with azimuth angle and reflection angle binning. This binning requires computing the reflection and azimuth angles $\theta_0$ and $\phi_0$ for each $k_s$, $k_r$ pair in the inner loop. With the outer loop of frequency, the total number of computational loops for the full azimuth imaging may be seven for a common shot migration.

The computational effort for wave propagation is the same for this angle-gather procedure as for a conventional RTM. However, the additional 4D Fourier transforms and the angle decomposition in the wavenumber domain increase the computational cost because the imaging condition is a multidimensional convolution. For a common shot RTM performing wide-azimuth imaging in the Gulf of Mexico, the migration apertures are typically 20 km in both inline and crossline directions with an inline sample rate of 25 m and a crossline sample rate of 40 m, and the maximum depth is typically 15 km with a depth sample rate of 15 m. The total number of wavenumbers for a single subsurface wavefield can reach $4 \times 10^8$ (kr or ks=800×500×1000), so the convolution of two wavefields can reach $1.6 \times 10^{17}$ floating point operations. Furthermore, an additional outer loop is present for calculating the final image and this outer loop may have approximately 200 frequencies. Thus, the total number of floating point operations may be $3.2 \times 10^{19}$. For such a large number of floating point operations, the algorithm described above may be well beyond the capability of current supercomputers.

According to an exemplary embodiment, to reduce the computing cost, a couple of other algorithms and/or techniques may be applied as discussed next. For example, dispersion relationships are used on the wave vectors to constrain the decomposition and convolution. For homogeneous isotropic velocity models, the norms of all slowness vectors are a fixed constant value, allowing the reduction of seven loops to five. For heterogeneous and/or anisotropic velocity models, the norms of the slowness vectors are not any more a fix value when the velocity varies in the local window, but they can be constrained to ranges between minimum and maximum values, determined by maximum and minimum values of the phase velocity. In cases with a wide range of velocities (such as marine environments over salt), the computational cost reduction due to this constraint is much less dramatic than that of cases with a small range of velocities.

Then, the wavefields of the image are decomposed in overlapping local spatial windows. In this decomposition, the local window sizes typically have an equal size in three spatial dimensions. A window size of a few wavelengths may be used at dominant frequency with 50% overlap in each spatial dimension. Using local windows reduces the cost of the 3D convolution by several orders of magnitude since it reduces the total number of wavenumbers. Using local windows also allows for a more efficient use of the dispersion relationships because the local range of the slowness vector norms is usually much smaller than the global range. For example, by choosing kr or ks=64×64×64 and taking into consideration the number of frequencies to be around 200 and the number of windows to be around 1664 times 8, where 8 is the number of overlap windows, the total number of floating point operations may be reduced to about $2.0 \times 10^{17}$.

However, two issues arise from the local window scheme discussed above. First, if the window size is very small, the small number of spatial samples in the input window results in a small number of wavenumbers in the Fourier domain. The sparse representation of wave propagation directions caused by the small number of wavenumbers will, in turn, cause poor resolution in the angle domain. For example, 32 wavenumbers in the x direction will result in an angle resolution greater than 6°.

Second, as the window size becomes smaller, the effects of window boundary truncation become larger, so that Gibbs artifacts can contaminate the wave number components and degrade the migration results. These two phenomena were investigated by the present inventors and it was proposed a wavenumber-domain oversampling scheme inside an anti-leakage Fourier transform (ALFT) for alleviating both issues.

The ALFT with oversampled wavenumber scheme provides good angular resolution and reduces the boundary Gibbs artifacts. The ALFT algorithm can overcome the "spectral leakage" when the Fourier coefficients are not orthogonal after the oversample of wavenumbers, and is capable to handle aliased data. Briefly, the ALFT algorithm works as follows. First, use discrete Fourier transforms (DFT) or its alternative algorithm to estimate the Fourier coefficients for all the wavenumbers k. Then, it selects the one with the maximum energy and adds maximum energy component to the output wavenumber. Then, it performs an inverse discrete Fourier transforms (DFT) back to an input grid. Finally, the ALFT algorithm subtracts the back transformed data in the previous step from input on input grid. These steps are then repeated for each Fourier coefficient until all the coefficients are evaluated.

Figure 4:
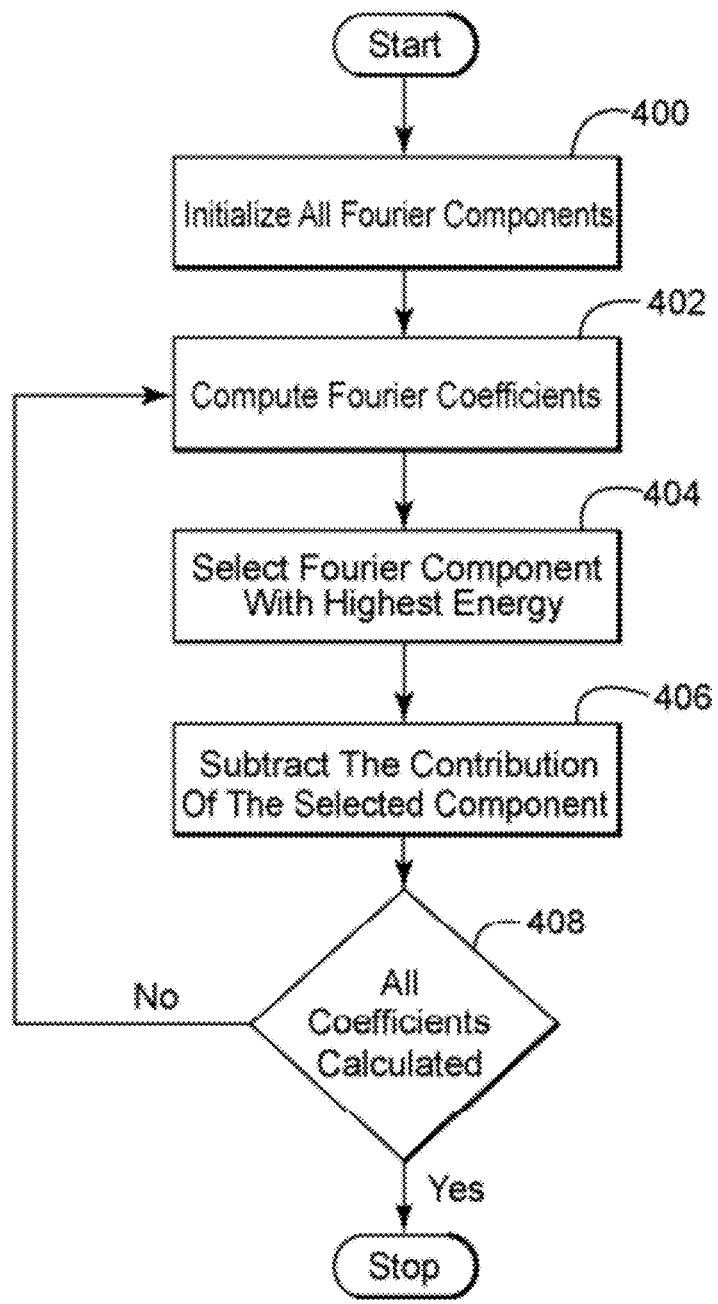
FIG. 4 is a flowchart illustrating an anti-leakage Fourier transform.

Thus, the ALFT algorithm may be implemented in the following steps as illustrated in FIG. 4. In step 400, initialize all the Fourier components of the DFT to zero. In step 402, compute all the Fourier components of the input data. It is noted that other Fourier transforms may be used instead of the DFT. In step 404, select the Fourier coefficient with the maximum energy, and accumulate its contribution to the existing Fourier component. In step 406, subtract the contribution of this coefficient from the input data. Then, in step 408 determine whether all the Fourier coefficients have been calculated. If the answer is yes, then stop the ALFT otherwise repeat steps 402 to 406 until the updated residual input data is small enough.

As noted above, according to an exemplary embodiment, a wavenumber-domain oversampling scheme is applied within the ALFT algorithm. In one application, an oversampling ratio of 8 may be used in all three spatial dimensions. The oversampling scheme increases the number of wavenumbers dramatically. After oversampling the wave numbers for each wavefield in a local window, the number of wave numbers might be as high as $2^{24}$, thus re-introducing the possibility of a large convolution cost. For example, taking an oversampling ratio of 4, that means that kr or ks=64×64×64×4 with a total number of floating point operations of about $8.0 \times 10^{20}$, which is again an increased in the computing cost.

To recapitulate, the use of the ALFT allows to control the cost of the convolution. The oversampling scheme in ALFT favors the use of small local window size over the preservation of all wavenumber information from the wavefields, and the small window size tends to give a better approximation of plane waves to the wavefields by an oversampling scheme inside of the ALFT algorithm. Furthermore, the ALFT can be used to reveal the most energetic wavenumbers.

In other words, in real applications, a relatively small number of wavenumbers will contribute most of the energy of the wavefield in a local window. Thus, a few energetic wavenumbers from both the source and the receiver wavefields will contribute to the convolution. For example, the most energetic wavenumbers may be limited to 50, i.e., kr or ks=50 which produces a total number of floating point operations of about $6.656 \times 10^9$, which is much reduced number of operations that can be tackled by today's computers.

Figure 5:
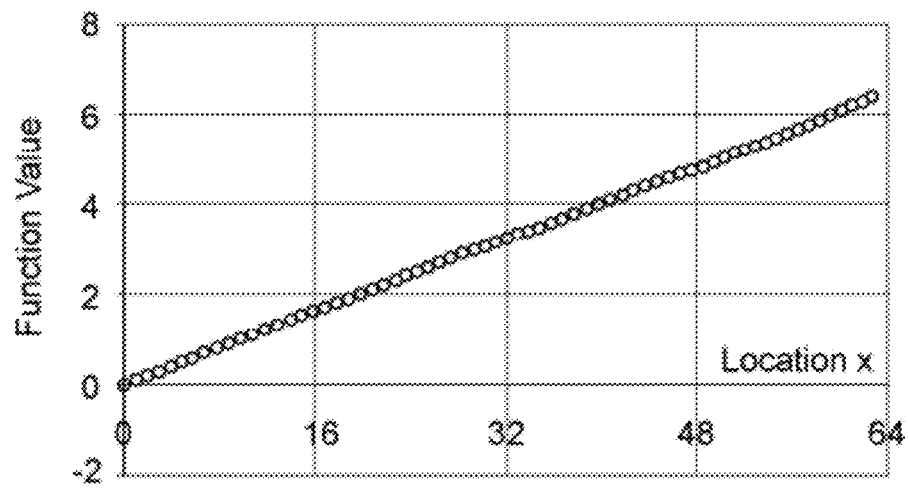
FIG. 5 is a graph showing a test function.
Figure 6:
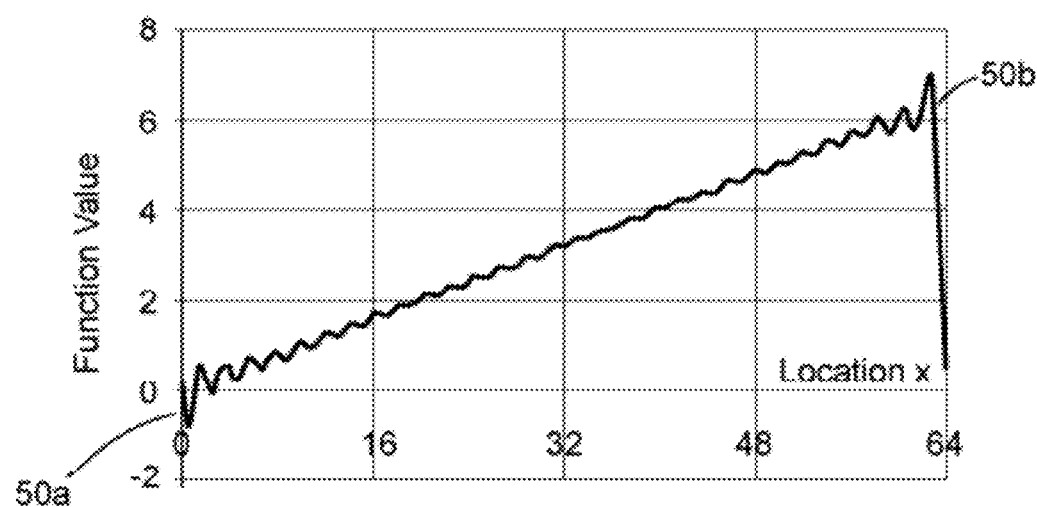
FIG. 6 is a graph of a function that reconstitutes the test function of FIG. 5 by FFT.

To exemplify the power of the novel method, a simple function y=0.1x plotted in FIG. 5 is used to illustrate the ALFT solution. FIG. 5 shows a regular sampling with sampling locations x∈[0, . . . , 63]. The sampled data includes 64 samples with a sampling rate of 1, i.e., a regular grid. Because the input data is sampled on a regular grid, the Fourier components are orthogonal to each other and there is no frequency leakage. A straightforward ALFT cannot improve the reconstruction in this ideal case. However, with the wavenumber sampling rate of FFT theory, FIG. 6 shows the continuous reconstruction of Fourier components computed by FFT. The ringing artifacts appearing at the two edges 50a and 50b are the known Gibbs phenomenon. This example indicates that truncating the sampling range introduces noise near the boundary, especially for those wavefields whose wavenumbers are not at the exact wavenumber sampling location of the FFT theory.

According to an exemplary embodiment, the data in the wavenumber domain is oversampled as discussed above, as in ALFT the wavenumber could be an arbitrary value. In a small window size application, the number of input traces for ALFT is smaller than for large window size applications, especially in the case of numerous dimensions. This novel approach notably saves the computational cost of ALFT. However, after oversampling the wavenumber, the number of wavenumbers may be larger than when using the FFT theory. The number of wavenumbers may even reach the same number of wavenumbers as when using large window size applications. Thus, this approach results in high computational cost for the wavenumber domain convolution.

Figure 7:
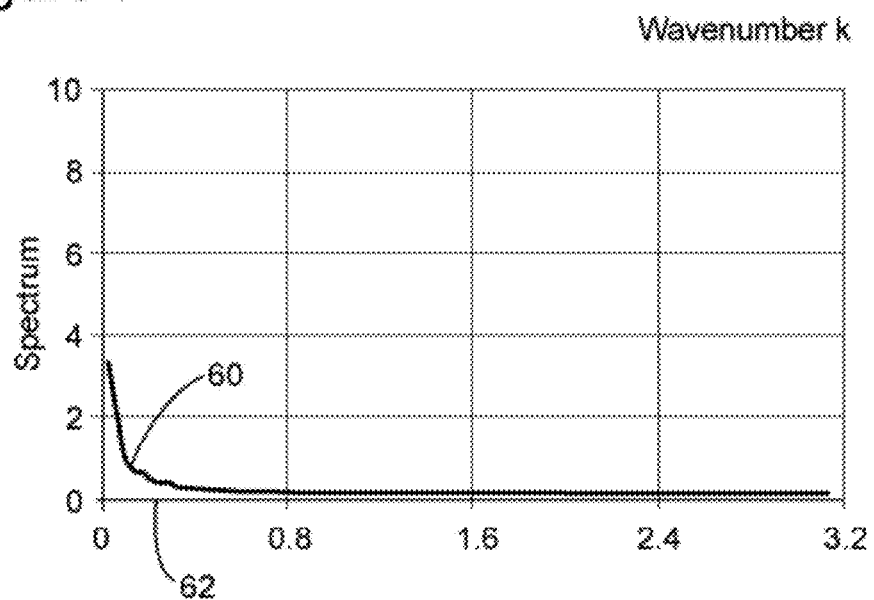
FIG. 7 illustrates spectra obtained for the function of FIG. 5 by FFT and ALFT according to an exemplary embodiment.
Figure 8:
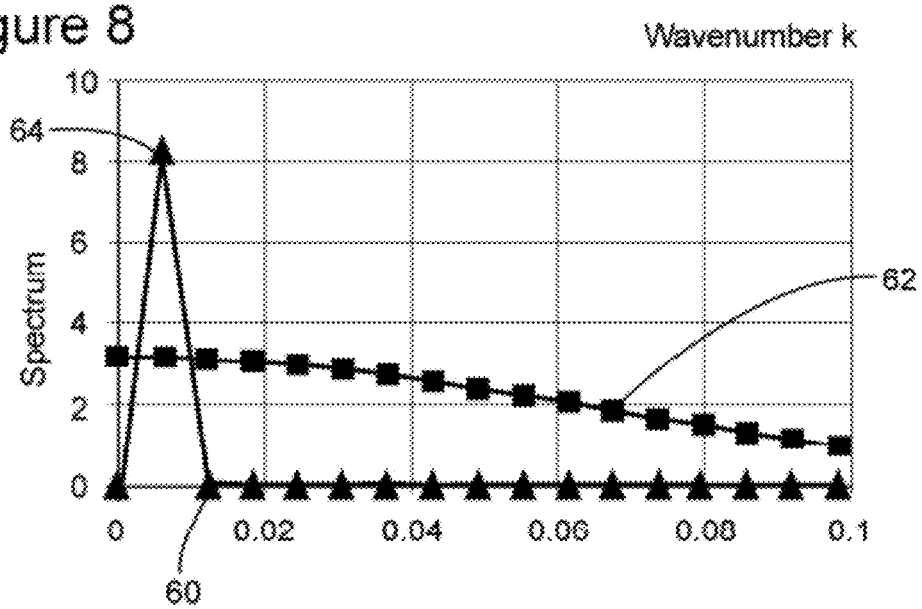
FIG. 8 illustrates the spectra of FIG. 7 in more details according to an exemplary embodiment.

However, using smaller window sizes, the seismic events are closer to linear events and thus, the "spiky wavenumbers" subset of the total wavenumbers could represent well the input data. This advantage is illustrated by a 1D example in FIGS. 7 and 8. FIG. 8 shows a more detailed view of the spectrum for a low wavenumber k, e.g., smaller than 0.1. FIGS. 7 and 8 show a line 60 corresponding to a spectrum computed by FFT. Another spectrum computed by ALFT is shown by line 62. It is noted that line 62 better describe the expected frequency for the model. In the example of FIG. 8, an interesting phenomenon shows up in the area of the first non-zero wave number. The ALFT spectrum shows only one value 64 with a large energy while the FFT clearly illustrates the frequency leakage.

Figure 9:
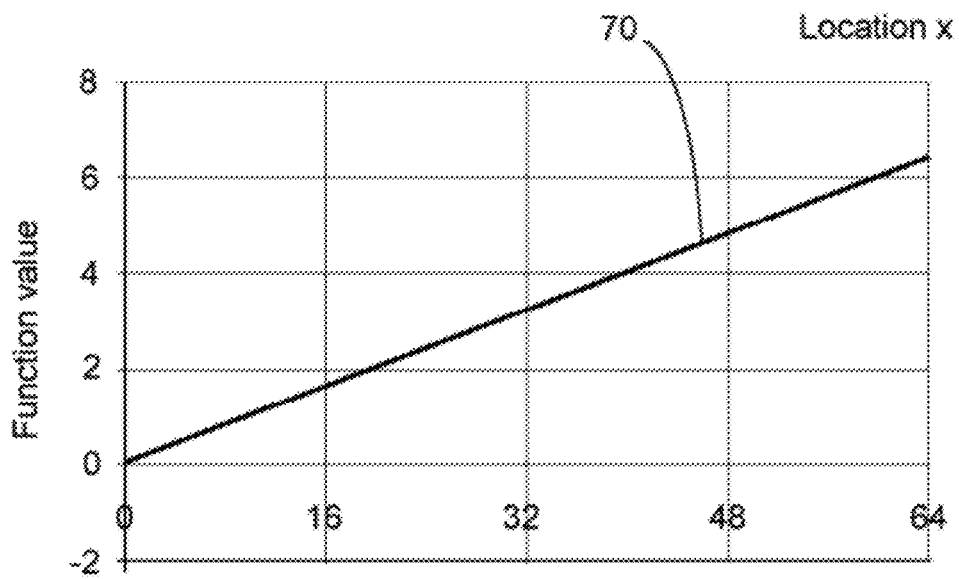
FIG. 9 illustrates the reconstructed function of FIG. 5 according to an exemplary embodiment.
Figure 10:
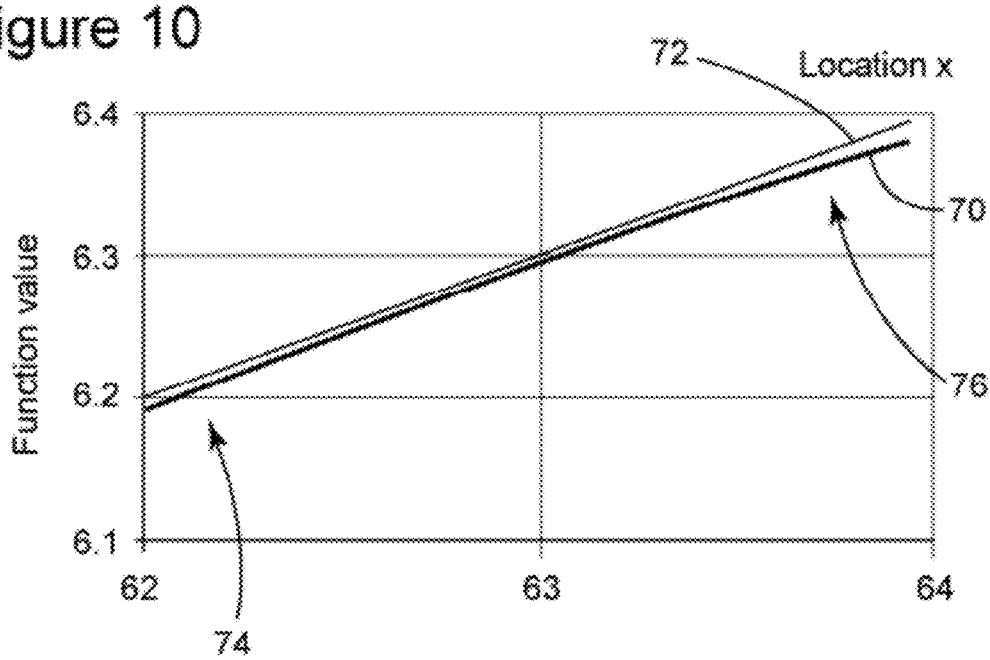
FIG. 10 shows the reconstructed function and the original function and the their mismatch according to an exemplary embodiment.

FIG. 9 shows the reconstructed continuous function (line 70) of FIG. 5. Compared to the exact solution (line 72) shown in FIG. 10, the reconstructed function 70 has small errors and the largest mismatches in the two boundary areas 74 and 76 are as shown in FIG. 10.

In complex areas, the number of spiky events in the wavenumber domain is generally more than one. Thus, in practice, it may be enough to take only 50~100 of the highest energy wavenumbers at a local window for a fixed time slice instead of $2^{24}$ wavenumbers for convolution. This scheme can reduce the convolution cost significantly, and it also can reduce the cost of applying the imaging condition expressed by equation (24). In practice, the computational effort of spatial windowing, applying the ALFT, and performing the full angle imaging, notably exceeds the effort of a conventional RTM (5~10 times more computational expensive), but remains feasible with current super computers (e.g., PC clusters).

Figure 11:
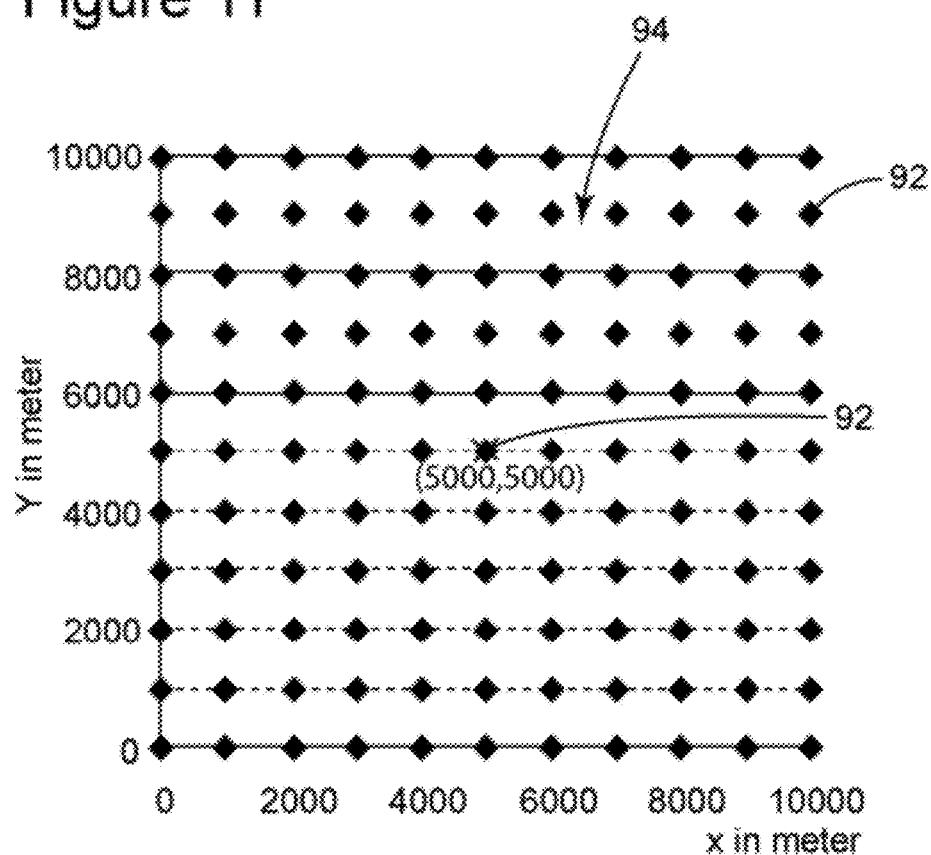
FIG. 11 illustrates the location of receivers and a sound source according to an exemplary embodiment.

The novel methods discussed above are now applied to real life situations. First, the 3D RTM is tested in a constant velocity medium. A model is used having five flat reflectors with a depth spacing of 1.0 km. A wide azimuth common shot data set is synthesized by simulating a single wide azimuth shot record indicated by reference number 92 in FIG. 11. The locations of the receivers are distributed on a 100 m by 100 m grid with a maximum offset of 5.0 km in both X and Y directions as also illustrated in FIG. 11. The data was synthesized with acquisition of a single shot located at surface location (5.0 km, 5.0 km), which is the centre point of the receiver array 94.

Figure 12:
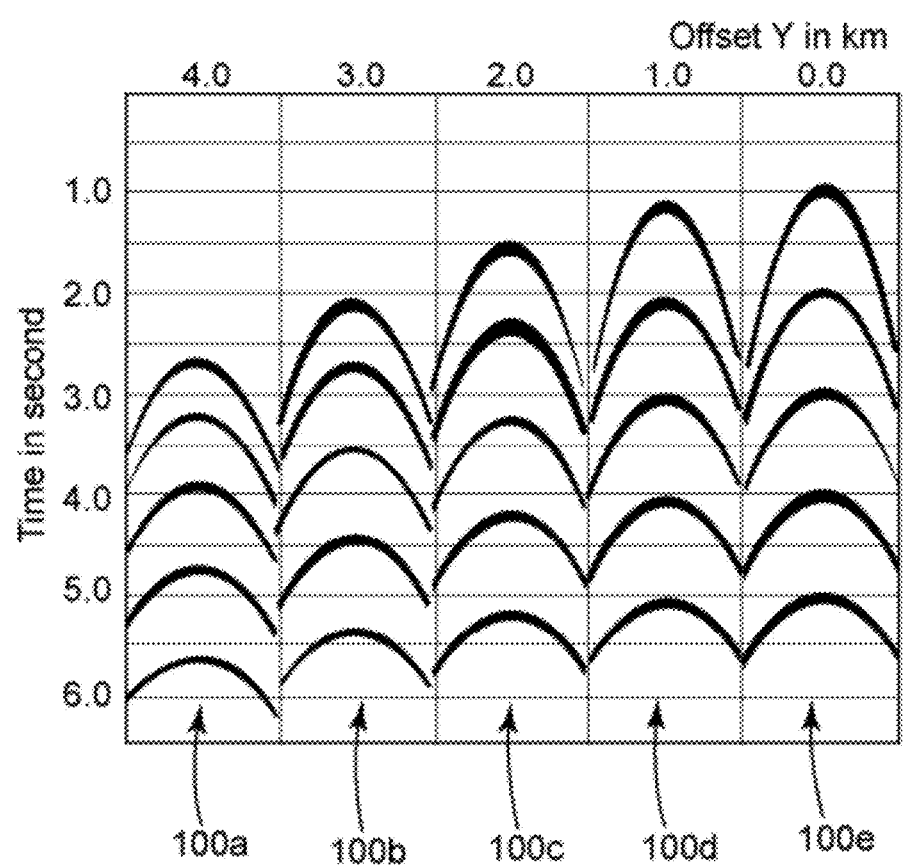
FIG. 12 illustrates synthetic seismic data according to an exemplary embodiment.
Figures 13, 14, 15:
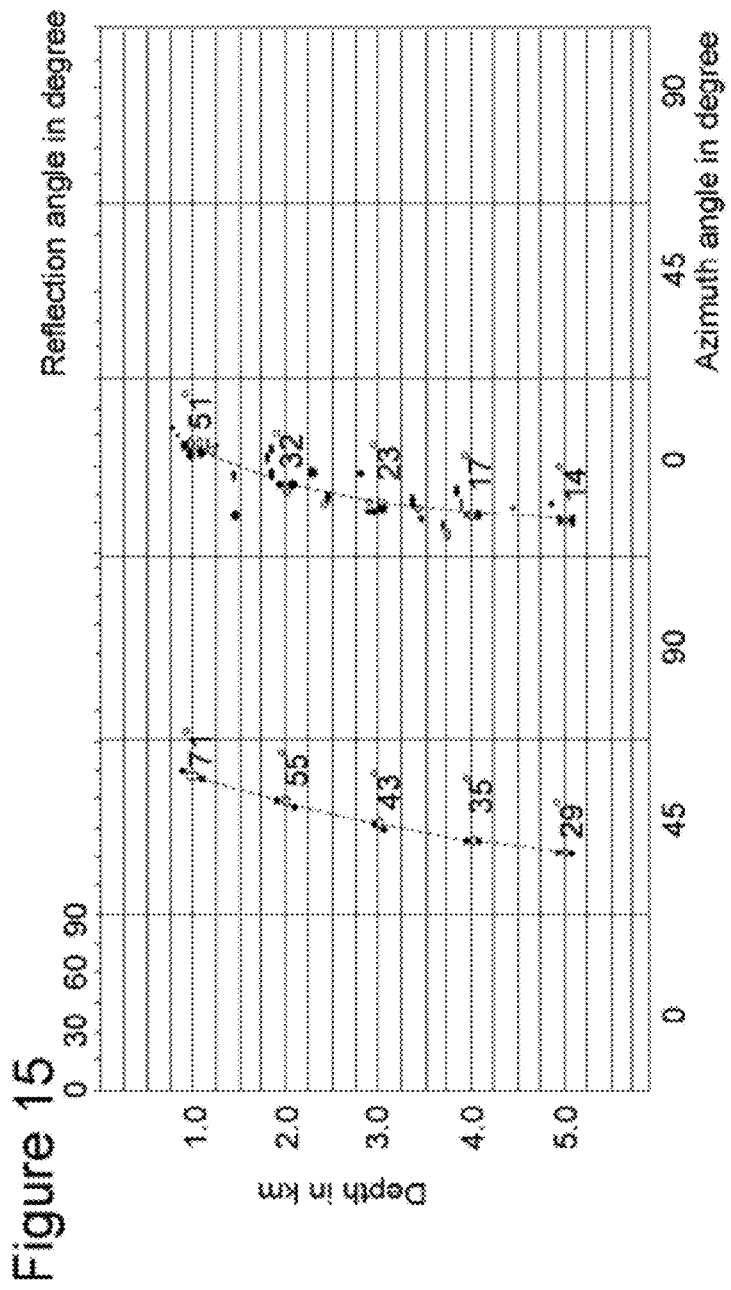
FIGS. 13 and 14 illustrate image locations according to an exemplary embodiment.
FIG. 15 illustrates common azimuth angle CIGs calculated based on the synthetic data of FIG. 12 according to an exemplary embodiment.

Five tiles 100a-e of synthetic seismic data are shown in FIG. 12. Common shot RTM was performed to output 3D-angle CIGs with eight azimuth angles. Two image locations (3.0 km, 3.0 km) and (3.75 km, 5.0 km) were selected to output full azimuth ADCIGs. FIGS. 13 and 14 illustrate the correctness of the above model and FIG. 15 shows that the theoretical terminations of the events are consistent with the results. These figures also illustrate the resolution of the novel algorithm. Because this is a single common shot RTM, the contributions to the angle gathers are one point for each location within the correct azimuth. These are specular arrivals identified at the correct reflection angles by the novel procedure.

Figure 16:
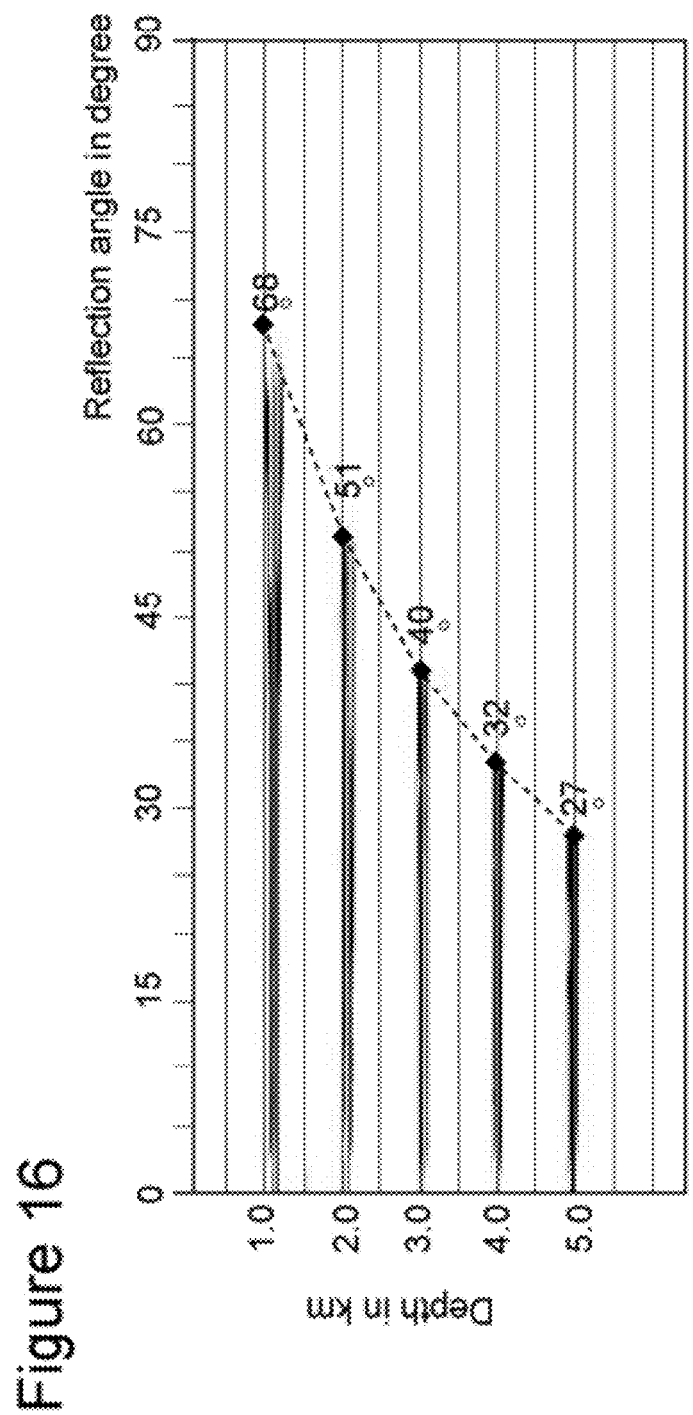
FIG. 16 illustrates a stack of all contributions from a complete wide azimuth simulated acquisition according to an exemplary embodiment.

The novel approach of computing 3D ADCIG illustrate a superior resolution, the specular energy is well concentrated to the theoretical angle position, and this is well resolved in both the reflection angle and azimuth angle. Next, a simulated complete wide-azimuth acquisition by laterally translating the single shot record onto a regular grid of shot locations, spaced on a regular 100 m by 100 m grid over the whole survey is discussed with reference to FIG. 16. FIG. 16 shows the stack of all contributions from this complete wide azimuth acquisition. The terminations of angle gathers at the different depths are consistent with the theoretical solution, with good amplitude preservation.

Figure 17:
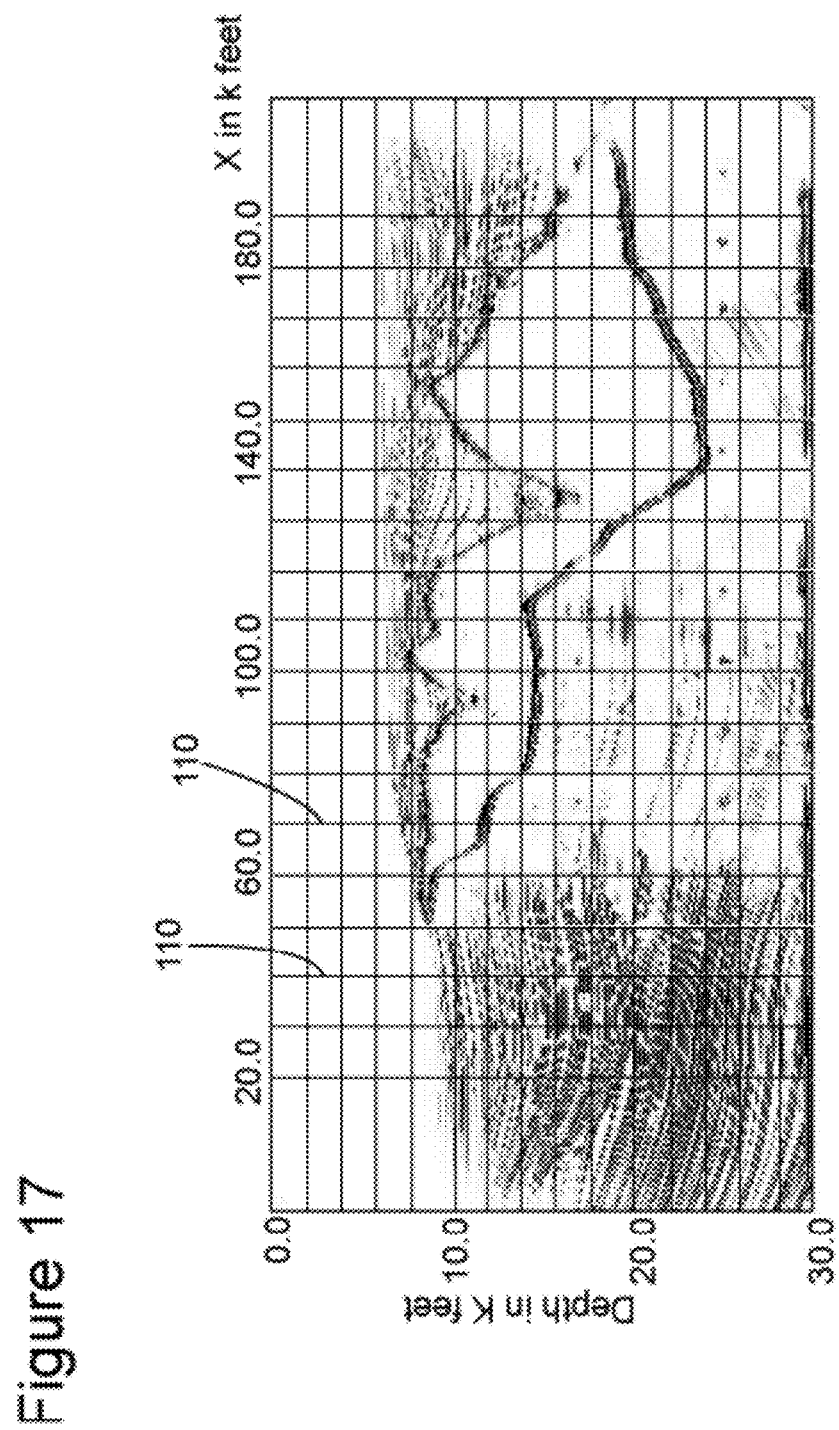
FIG. 17 illustrates a stacked image of a central line according to an exemplary embodiment.
Figure 18:
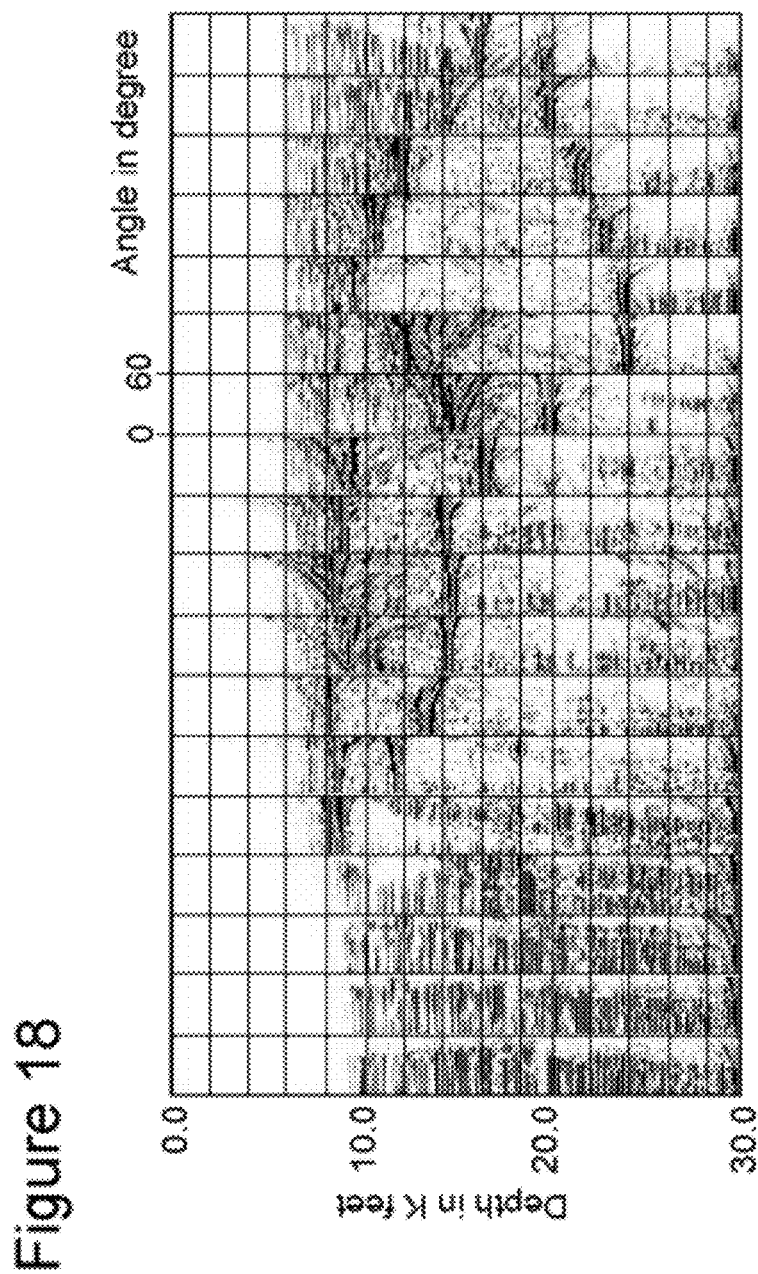
FIG. 18 illustrates 2D ADCIGs converted from subsurface offset gathers according to an exemplary embodiment.
Figure 19:
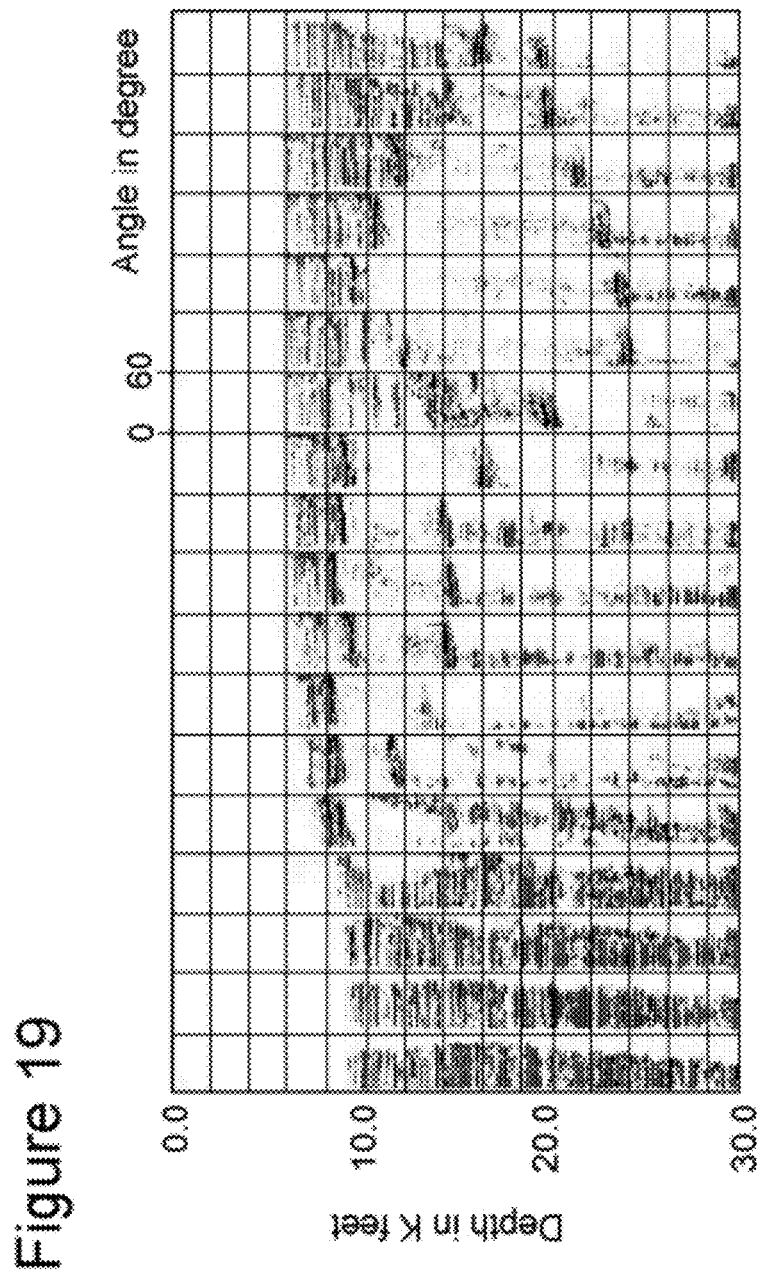
FIG. 19 illustrates zero azimuth 3D ADCIGs according to an exemplary embodiment.

For complex structural imaging, ADCIG algorithms for OWEM or RTM have so far only considered 2D or 3D reflection angles, without considering reflection azimuth in 3D. According to an exemplary embodiment, an example of reflection/azimuth angle domain CIGs from RTM using the Sigsbee synthetic data set is provided. The original model is 2D. This was generalized to a 2.5D model by padding the model in the Y direction. In order to maintain the 3D amplitudes valid, a high-order FD modelling scheme was used to generate 3D synthetic data with zero azimuth (single streamer) acquisition. For this restricted 3D data set, it is expected that the 3D ADCIGs have notably energy with full reflection angles only at zero azimuth. FIG. 17 shows the stacked image of the central line (e.g., a target line) using 3D RTM. Eighteen locations (represented by 18 lines 110 in FIG. 17) were selected to output CIGs. The 2D ADCIGs converted from subsurface offset gathers are shown in FIG. 18. The maximum subsurface offset is 5000 feet with a 75 feet offset increment. The ADCIGs are sampled every 2°. These gathers display a smearing effect. This effect is due to sampling issues in the gather conversion from space to wavenumber to angle. The zero azimuth 3D ADCIGs are shown in FIG. 19. The 3D angle CIGs exhibit better signal to noise (S/N) and higher resolution with sharper event terminations at far angles than the 2D results from the conventional approach.

Figure 20:
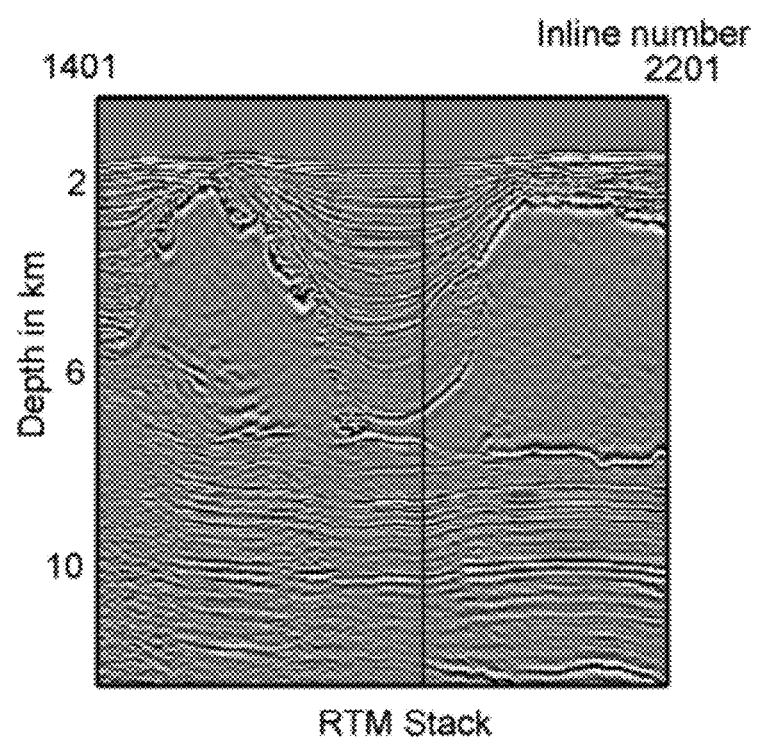
FIG. 20 shows a TTI RTM inline stacked section in a complex area.

In another exemplary embodiment, a true wide azimuth test was performed from a deepwater survey in the Garden Banks area of the Gulf of Mexico. The seismic data were acquired with maximum inline offset of 8.0 km and crossline offset of 4.0 km. FIG. 20 shows a TTI RTM inline stacked section in a complex area that includes a mini basin between two complex salt bodies with a rough top of salt geometries and overhangs. The subsalt events are well imaged. Two TTI RTMs were performed.

Figure 21:
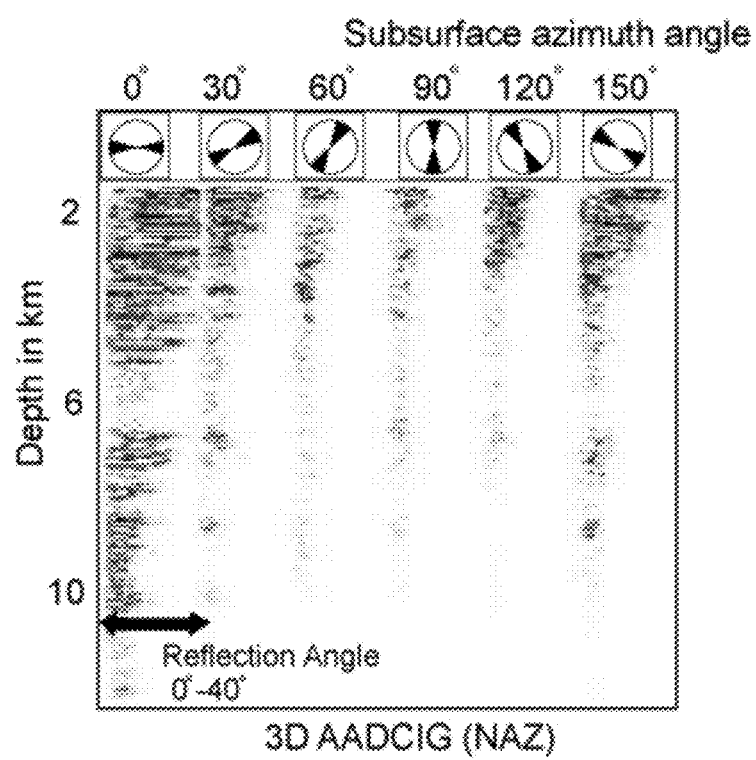
FIG. 21 shows a single 3D ADCIG from a migration of a narrow-azimuth subset of the wide azimuth data according to an exemplary embodiment.
Figure 22:
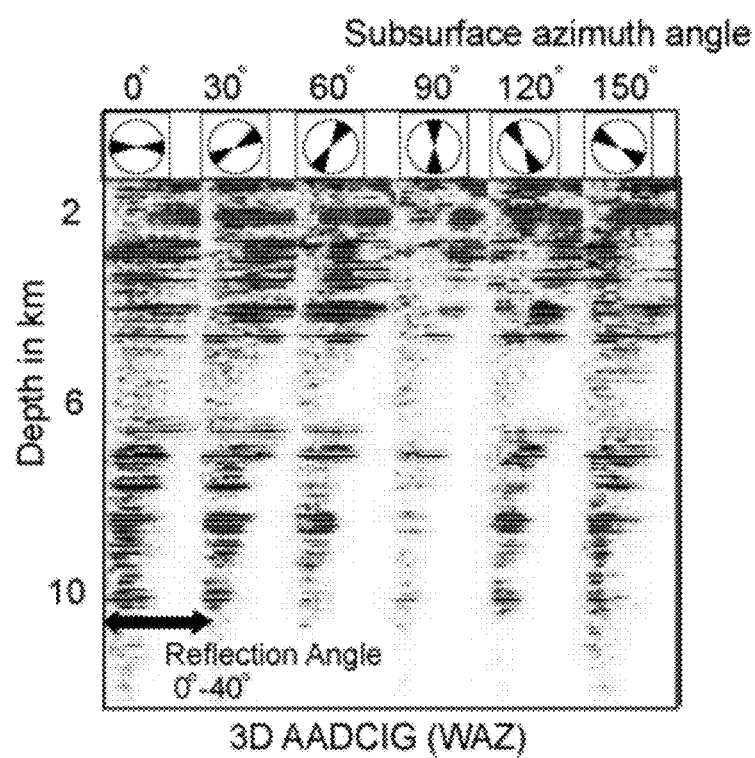
FIG. 22 shows 3D angle CIG from a migration of a full wide azimuth data set according to an exemplary embodiment.

First, a narrow-azimuth subset of the wide azimuth data was migrated. FIG. 21 shows a single 3D ADCIG from this migration. The reflection angle range is 0~40° with a sampling rate of 2°. Six subsurface azimuth sectors were used with a sample rate of 30°. The contributions of azimuth angles to the CIGs were also plotted above the 3D ADCIG. For the narrow-azimuth subset of the data, the energy in the ADCIG is concentrated at zero azimuth, with some leakage to the nearby azimuth angles at shallow depths. Second, the full wide azimuth data set was migrated. FIG. 22 shows the 3D angle CIG. The energy distribution is more uniformly spread over azimuth angles, except at great depths around azimuth angle 90°, which has less energy at far reflection angles because the maximum crossline offset (90° surface azimuth) is only one-half the maximum inline offset (0° surface azimuth).

Figure 23:
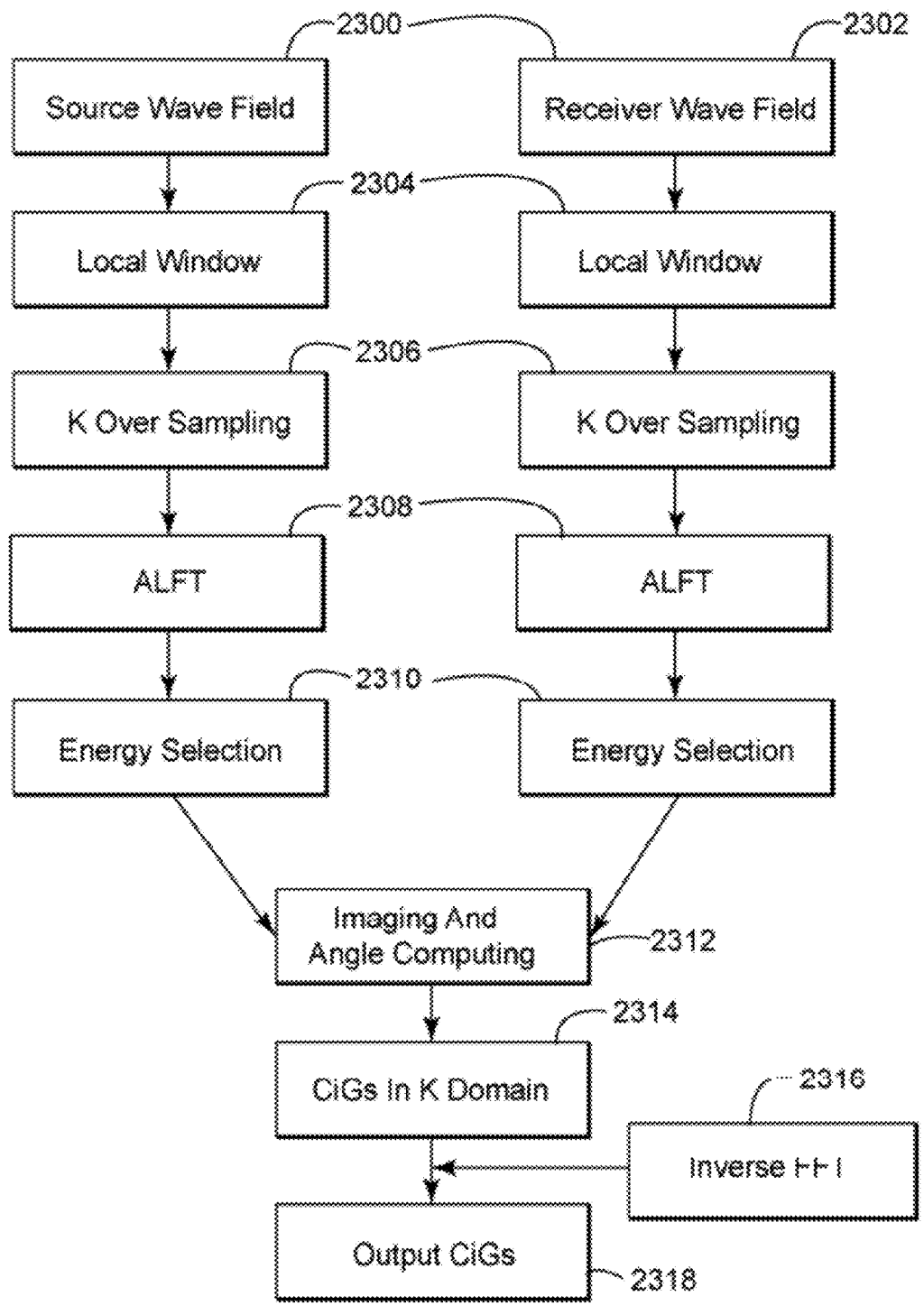
FIG. 23 is a flowchart of a method for calculating 3D angle gathers from reverse time migration according to an exemplary embodiment.

According to an exemplary embodiment illustrated in FIG. 23, a method for calculating CIGs includes a step 2300 of calculating a source wavefield (based on equation (20)) and a step 2302 of calculating a receiver wavefield (based on equation (21)). The wavefields generated in steps 2300 and 2302 are 3D true-amplitude angle domain CIGs from RTM. This formulation is numerically stable, adapts to different acquisition geometries, provides high quality input to tomography, and provides friendly migration amplitude for the amplitude versus angle analysis.

To reduce the computation cost, local windows are applied in step 2304. However, this step may introduce undesired boundary effects. Thus, at step 2306 an oversampling in the wavenumber domain is applied. While reducing the boundary effects, this step increases the computational cost. An ALFT algorithm is applied in step 2308 to each of the results of steps 2300 and 2302. The ALFT without additional steps may increase the computational cost. Thus, in step 2310 only those contributions are selected that have the highest energy, which reduces the computational cost as discussed above. At step 2310 the source and receiver wavefields in the k domain are obtained and these wavefields have a sparse representation due to the ALFT. Thus, in step 2312, a correlation type imaging condition (e.g., equation (24)) is applied in the wavenumber domain and angles $\theta$ and $\phi$ are calculated, for example, based on equations (1). CIGs are determined in step 2314. However, as the CIGs are in the k domain, an inverse FFT is applied in step 2316 for determining the CIGs in the space domain as shown in step 2318.

Figure 24:
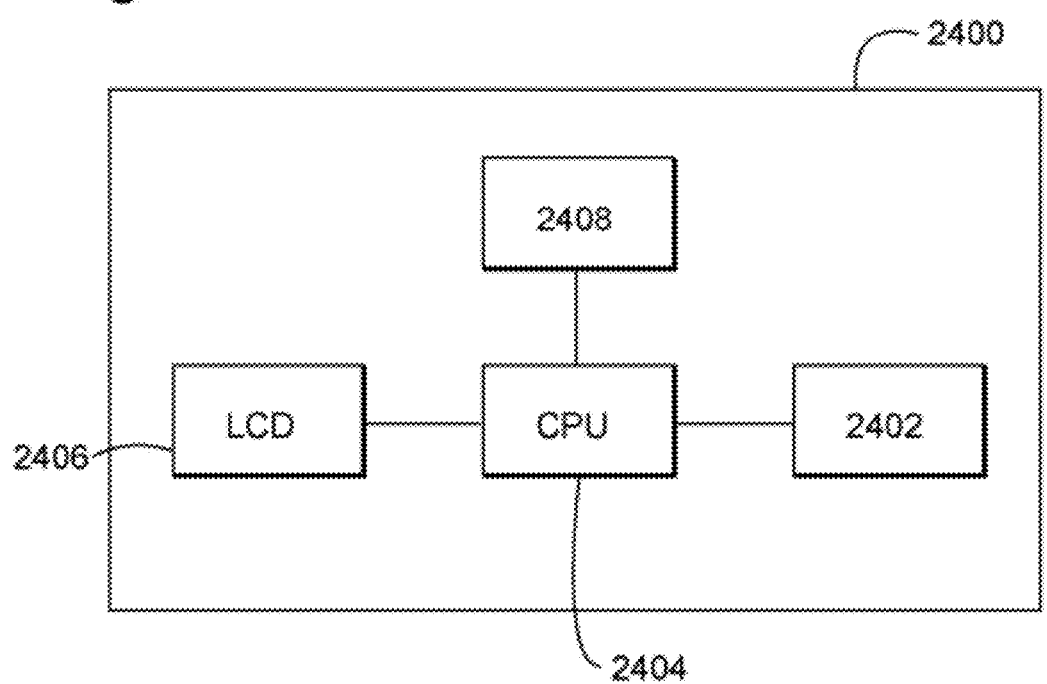
FIG. 24 is a schematic diagram of a processing device for calculating 3D angle gathers from reverse time migration according to an exemplary embodiment.

The above discussed method may be implemented in an exemplary embodiment in a processing apparatus 2400 as illustrated in FIG. 24. The processing device 2400 may be specifically configured to calculate angle domain common image gathers (ADCIGs) for use in generating a final image of a subsurface of the earth. The processing device 2400 may be, for example, a computer, a processor, a server, or a network of computers, processors or servers. The processing device 2400 may include an interface 2402 configured to receive data from outside, e.g., seismic data. The interface 2402 may accommodate internet connection, satellite connection, keyboards, etc. The processing device 2400 also includes a processor 2404 connected to the interface 2402 and configured to execute one or more or all of the steps discussed with regard to FIG. 23. The processing device 2400 may have dedicated circuitry for each step of FIG. 23 or the processor 2404 may be configured with software to execute all the steps shown in FIG. 23. The processing device 2400 may also include a display 2406 for displaying a final image calculated by the processor 2404. Various data used for calculating the final image may be stored in a storage device 2408 that is connected to the processor 2404. Other known components of a computer, server or processor may also be present.

The disclosed exemplary embodiments provide a system and a method for more accurately and faster processing data related to a subsurface. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for calculating, in a computing device, angle domain common image gathers (ADCIGs) for use in generating a final image of a subsurface of the earth, the method comprising:

calculating with wavefield forward propagation, in a time-space domain, a source wavefield $p_F$ of a seismic source;

calculating with wavefield back propagation, in the time-space domain, a receiver wavefield $p_B$ of a seismic receiver configured to detect a seismic wave generated by the seismic source, wherein the seismic wave emitted by the seismic source enters the subsurface of the earth and gets reflected on a reflector of the subsurface prior to arriving at the seismic receiver;

applying an algorithm of anti-leakage Fourier transform (ALFT) to transform the source wavefield $p_F$ to a wavenumber domain;

applying the ALFT algorithm to the receiver wavefield to transform the receiver wavefield in the wavenumber domain;

determining an imaging condition to the ALFT source and receiver wavefields in the wavenumber domain;

computing a reflection angle $\theta$ and an azimuth angle $\phi$ of the source wavefield $p_F$ and receiver wavefield $p_B$ in the wavenumber domain;

calculating the ADCIGs in the wavenumber domain; and applying an inverse fast Fourier transform (FFT) to determine the ADCIGs in the space domain.

2. The method of claim 1, further comprising:
applying local windows for calculating Fourier coefficients of the ALFT algorithm.

3. The method of claim 2, further comprising:
using an oversampling scheme in the wavenumber domain.

4. The method of claim 3, further comprising:
selecting those wavenumbers that correspond to energetic components and removing the remaining wavenumbers prior to the determining step.

5. The method of claim 1, further comprising:
calculating the source wavefield $p_F$ as a forward propagation of a source signature.

6. The method of claim 5, wherein the source wavefield $p_F$ is calculated based on equations:

$$\begin{cases} \left(\frac{1}{v^2}\frac{\partial^2}{\partial t^2} - \nabla^2\right)p_F(x;t) = 0, \\ p_F(x, y, z=0;t) = \delta(x-s)\int_{-\infty}^{t} f(t')dt', \end{cases}$$

where $v$ is the velocity of $p_F$, $\nabla^2$ is the Laplacian operator, $x$ is a position where the Laplacian operator is applied to the source wavefield $p_F$, $t$ is the time at which the source wavefield $p_F$ is present at position $x$, $z$ is a depth component of the $x$ position, $\delta(x-s)f(t)$ is the source signature, $\delta$ is a Dirac function, and $s$ is a location of the seismic source.

7. The method of claim 1, further comprising:
calculating the receiver wavefield $p_B$ as a backward propagation of data recorded by the seismic receiver.

8. The method of claim 7, wherein the receiver wavefield $p_B$ is calculated based on equations:

$$\left(\frac{1}{v^2}\frac{\partial^2}{\partial t^2} - \nabla^2\right)p_B(x;t) = 0,$$

$$p_B(x, y, z=0;t) = \delta G_{obs}(x,y;s;t),$$

where $v$ is the velocity of $p_B$, $\nabla^2$ is the Laplacian operator, $x$ is a position where the Laplacian operator is applied to the reflector wavefield $p_R$, $t$ is the time at which the receiver wavefield $p_B$ is present at position $x$, $z$ is a depth of the position $x$, $\delta G_{obs}(x,y;s;t)$ is the recorded data, and $s$ is the location of the seismic source.

9. The method of claim 1, further comprising:
determining a true amplitude migration asymptotic equation in both the reflection angle $\theta$ and the azimuth angle $\phi$, wherein the equation is:

$$R(x, \theta_0, \varphi_0) = \int\int\int \delta(\theta - \theta_0)\delta(\varphi - \varphi_0)$$

$$dsdrd\omega \frac{32\pi i\omega \cos\theta A(s, x, r)p_z^s p_z^r e^{-i\omega T(r,x,s)}\delta G_{obs}}{\sin\theta},$$

where R is a reflectivity of the subsurface, $x$ is a position where the reflectivity is calculated, $s$ is a position of the seismic source, $r$ is a position of the seismic receiver, $\delta G_{obs}$ is data recorded by the seismic receiver, $\delta$ is a Dirac function, $w$ is a frequency of the wavefields, A is a product between (i) a ray amplitude from location $s$ to location $x$ and (ii) a ray amplitude from location $x$ to location $r$, $p_z^s$ is related to $p_F$ and $p_z^r$ is related to $p_B$.

10. The method of claim 9, further comprising:
transforming the true amplitude migration asymptotic equation into a true amplitude reverse time migration (RTM) equation which is given by $$\bar{R}(x, \theta_0, \varphi_0) = 16\pi \int\int\int \frac{v(x)}{\sin\theta}\delta(\theta - \theta_0)\delta(\varphi - \varphi_0)p_F p_B dsd\omega,$$

where the common image gathers (CIGs) are given by $\bar{R}(x,\theta_0,\phi_0) = R(x,\theta_0,\phi_0)v(x)/2\cos\theta_0$, $p_F = G^*(x,s)p_z^s$, and $p_B = \int dr G^*(x,r)p_z^r \delta G_{obs}$, with G being a Green function.

11. The method of claim 10, wherein the ADCIGs are given by:

$$\bar{R}_s(x, \theta_0, \varphi_0) =$$

$$\frac{16\pi v(x)}{\sin\theta_0}\sum_\omega \sum_k \sum_{(k_r-k_s)} \delta(\theta - \theta_0)\delta(\varphi - \varphi_0)p_F(k_s, \omega)p_B(k_r, \omega)e^{ik\cdot x},$$

with k being the wavenumber.

12. The method of claim 11, wherein the ADCIGs are rewritten as $$\bar{R}_s(x, \theta_0, \varphi_0) = \frac{16\pi v(x)}{\sin\theta_0}\sum_k I_s(k, \theta_0, \varphi_0)e^{ik\cdot x},$$

based on the imaging condition $$I_s(k, \theta_0, \varphi_0) = \sum_\omega \sum_{(k_r-k_s)} \delta(\theta - \theta_0)\delta(\varphi - \varphi_0)p_F(k_s, \omega)p_B(k_r, \omega)$$

expressed in the wavenumber domain.

13. The method of claim 12, further comprising:
applying the inverse FFT transform to $I_s(k,\theta_0,\phi_0)$ to obtain the ADCIGs.

14. The method of claim 13, wherein the ADCIGs are 3-dimensional.

15. The method of claim 1, wherein the computing device is a specific computer that generates the final image and displays the final image on a display.

16. A non-transitory computer readable medium including computer executable instructions, wherein the instructions, when executed, implement a method for calculating angle domain common image gathers (ADCIGs) for use in generating a final image of a subsurface of the earth, the method comprising:
- calculating with wavefield forward propagation, in a time-space domain, a source wavefield $p_F$ of a seismic source;
- calculating with wavefield back propagation, in the time-space domain, a receiver wavefield $p_B$ of a seismic receiver configured to detect a seismic wave generated by the seismic source, wherein the seismic wave emitted by the seismic source enters the subsurface of the earth and gets reflected on a reflector of the subsurface prior to arriving at the seismic receiver;
- applying an algorithm of anti-leakage Fourier transform (ALFT) to transform the source wavefield $p_F$ to a wavenumber domain;
- applying the ALFT algorithm to the receiver wavefield to transform the receiver wavefield in the wavenumber domain;
- determining an imaging condition to the ALFT source and receiver wavefields in the wavenumber domain;
- computing a reflection angle $\theta$ and an azimuth angle $\phi$ of the source wavefield $p_F$ and receiver wavefield $p_B$ in the wavenumber domain;
- calculating the ADCIGs in the wavenumber domain; and
- applying an inverse fast Fourier transform (FFT) to determine the ADCIGs in the space domain.

17. The medium of claim 16, further comprising:
applying local windows for calculating Fourier coefficients of the ALFT algorithm.

18. The medium of claim 17, further comprising:
using an oversampling scheme in the wavenumber domain.

19. The medium of claim 18, further comprising:
selecting those wavenumbers that correspond to energetic components and removing the remaining wavenumbers prior to the determining step.

20. A processing device configured to calculate angle domain common image gathers (ADCIGs) for use in generating a final image of a subsurface of the earth, the processing device comprising:
- an interface configured to receive seismic data; and
- a processor connected to the interface and configured to,
  - calculate with wavefield forward propagation, in a time-space domain, a source wavefield $p_F$ of a seismic source,
  - calculate with wavefield back propagation, in the time-space domain, a receiver wavefield $p_B$ of a seismic receiver configured to detect a seismic wave generated by the seismic source, wherein the seismic wave emitted by the seismic source enters the subsurface of the earth and gets reflected on a reflector of the subsurface prior to arriving at the seismic receiver,
  - apply an algorithm of anti-leakage Fourier transform (ALFT) to transform the source wavefield $p_F$ to a wavenumber domain,
  - apply the ALFT algorithm to the receiver wavefield to transform the receiver wavefield in the wavenumber domain,
  - determine an imaging condition to the ALFT source and receiver wavefields in the wavenumber domain,
  - compute a reflection angle $\theta$ and an azimuth angle $\phi$ of the source wavefield $p_F$ and receiver wavefield $p_B$ in the wavenumber domain,
  - calculate the ADCIGs in the wavenumber domain, and
  - apply an inverse fast Fourier transform (FFT) to determine the ADCIGs in the space domain.

\* \* \* \* \*